(12) United States Patent
Punati et al.

(10) Patent No.: US 9,007,918 B2
(45) Date of Patent: *Apr. 14, 2015

(54) TECHNIQUES FOR EFFICIENTLY UPDATING ROUTING INFORMATION

(71) Applicant: Brocade Communications Systems, Inc., San Jose, CA (US)

(72) Inventors: Vamsi Punati, Sunnyvale, CA (US); Hasnain Karampurwala, Redwood City, CA (US); Reshma Sudarshan, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,665

(22) Filed: Jun. 24, 2013

(65) Prior Publication Data

US 2014/0092762 A1     Apr. 3, 2014

Related U.S. Application Data

(63) Continuation of application No. 13/177,028, filed on Jul. 6, 2011, now Pat. No. 8,503,464.

(60) Provisional application No. 61/488,641, filed on May 20, 2011.

(51) Int. Cl.
   *G01R 31/08*     (2006.01)
   *H04L 12/761*     (2013.01)
   *H04L 12/721*     (2013.01)

(52) U.S. Cl.
   CPC .............. *H04L 45/16* (2013.01); *H04L 45/123* (2013.01)

(58) Field of Classification Search
None
See application file for complete search history.

(56) References Cited

U.S. PATENT DOCUMENTS

| | | | |
|---|---|---|---|
| 6,192,051 | B1 | 2/2001 | Lipman et al. |
| 6,393,486 | B1 | 5/2002 | Pelavin et al. |
| 7,058,016 | B1 | 6/2006 | Harper |
| 7,158,486 | B2 | 1/2007 | Rhodes |
| 7,185,107 | B1 | 2/2007 | Cassar |
| 7,230,924 | B2 | 6/2007 | Chiu et al. |
| 7,269,133 | B2 | 9/2007 | Lu et al. |
| 7,428,213 | B2 | 9/2008 | Vasseur et al. |
| 7,460,481 | B2 * | 12/2008 | Vasseur et al. ............... 370/238 |
| 7,545,756 | B2 | 6/2009 | Previdi |
| 7,554,921 | B2 | 6/2009 | Previdi et al. |
| 7,852,863 | B2 | 12/2010 | Madrahalli et al. |
| 7,987,288 | B2 * | 7/2011 | Charzinski et al. ........... 709/241 |
| 8,189,585 | B2 | 5/2012 | Dharwadkar et al. |
| 8,503,464 | B2 * | 8/2013 | Punati et al. .................. 370/401 |
| 8,565,247 | B2 | 10/2013 | Punati et al. |

(Continued)

OTHER PUBLICATIONS

Notice of Allowance for U.S. Appl. No. 12/610,143 mailed on Jun. 11, 2014, 12 pages.

(Continued)

*Primary Examiner* — Duc C Ho
(74) *Attorney, Agent, or Firm* — Kilpatrick Townsend & Stockton LLP

(57) ABSTRACT

Techniques for efficiently updating routing information in a network device such as a router. According to an embodiment of the present invention, the routing information is updated upon creation or deletion of an overlay tunnel without the network device having to regenerate a Shortest Path Tree (SPT) by performing full Shortest Path First (SPF) processing.

18 Claims, 23 Drawing Sheets

(56) References Cited

U.S. PATENT DOCUMENTS

| | | | |
|---|---|---|---|
| 8,873,563 | B2 | 10/2014 | Sen et al. |
| 2003/0179742 | A1 | 9/2003 | Ogier et al. |
| 2005/0015511 | A1 | 1/2005 | Izmailov et al. |
| 2005/0078656 | A1 | 4/2005 | Bryant et al. |
| 2005/0088965 | A1 | 4/2005 | Atlas et al. |
| 2005/0088977 | A1 | 4/2005 | Roch et al. |
| 2005/0111349 | A1 | 5/2005 | Vasseur et al. |
| 2005/0135256 | A1 | 6/2005 | Ball et al. |
| 2006/0159083 | A1 | 7/2006 | Ward et al. |
| 2006/0215579 | A1 | 9/2006 | Nadeau et al. |
| 2007/0041379 | A1 | 2/2007 | Previdi et al. |
| 2007/0112975 | A1 | 5/2007 | Cassar |
| 2007/0248065 | A1 | 10/2007 | Banerjea et al. |
| 2008/0084881 | A1 | 4/2008 | Dharwadkar et al. |
| 2008/0107114 | A1 | 5/2008 | Liu |
| 2010/0080235 | A1 | 4/2010 | Yamate et al. |
| 2010/0296517 | A1 | 11/2010 | Kompella |
| 2011/0044351 | A1 | 2/2011 | Punati et al. |
| 2011/0069706 | A1 | 3/2011 | Sen et al. |
| 2011/0075673 | A1 | 3/2011 | Hardie et al. |
| 2014/0044013 | A1 | 2/2014 | Punati et al. |

OTHER PUBLICATIONS

Moy, "*OSPF Version 2*,", RFC 2328, Standards Track, Apr. 1998, 204 pages, The Internet Society.

Li, "*Domain-Wide Prefix Distribution with Two-Level IS-IS*," RFC 5302, Standards Track, Oct. 2008, 15 pages, The IETF Trust.

Hopps, "*Routing IPv6 with IS-IS*," Standards Track, RFC 5308, Oct. 2008, 8 pages, The IETF Trust.

Callon, "Use of OSI IS-IS for Routing in TCP/IP and Dual Environments," RFC 1195, Dec. 1990, 80 pages.

"*Routing Freak! Shortest Path First (SPF) Calculation in OSPF and IS-IS*," Mar. 4, 2008, 6 pages, printed on Oct. 6, 2008 at URL: http://routingfreak.wordpress.com/2008/03/04/shortest-path-first-calculation-in-ospf-and-is.

"*Routing Freak! Shortest Path First (SPF) Algorithm Demystified...*," Mar. 6, 2008, 9 pages; printed on Oct. 6, 2008 at URL: http://routingfreak.wordpress.com/2008/03/06/shortest-path-first-algorithm-demystified/.

"*Routing Freak! The Complete and Partial SPF in IS-IS*," Mar. 6, 2008, 3 pages, printed on Oct. 8, 2008 at URL: http://routingfreak.wordpress.com/2008/03/06/the-complete-and-partial-spf-in-is-is/.

"*IS-IS Incremental SPF*," Prerequisites for IS-IS Incremental SPF, 8 pages, Cisco Systems, CA, 2003-2005.

Mills, "*Exterior Gateway Protocol Formal Specification*," RFC 904, Apr. 1984, 30 pages.

Non-Final Office Action for U.S. Appl. No. 12/544,170, mailed on Aug. 1, 2011, 19 pages.

Non-Final Office Action for U.S. Appl. No. 12/544,170, mailed on Jun. 18, 2012, 5 pages.

Non-Final Office Action for U.S. Appl. No. 12/610,143, mailed on Mar. 1, 2012, 14 pages.

Final Office Action for U.S. Appl. No. 12/610,143 mailed Aug. 15, 2012, 16 pages.

Notice of Allowance for U.S. Appl. No. 12/544,170 mailed on Dec. 13, 2012, 8 pages.

Notice of Allowance for U.S. Appl. No. 13/177,028 mailed on Mar. 4, 2013, 7 pages.

Notice of Allowance for U.S. Appl. No. 12/544,170 mailed on Jun. 24, 2013, 10 pages.

Notice of Allowance for U.S. Appl. No. 13/177,028 mailed on Mar. 26, 2013, 6 pages.

Non-Final Office Action for U.S. Appl. No. 14/057,680 mailed on Oct. 24, 2014, 7 pages.

\* cited by examiner

TECHNIQUES FOR EFFICIENTLY UPDATING ROUTING INFORMATION

CROSS-REFERENCES TO RELATED APPLICATIONS

The present application is a continuation of U.S. patent application Ser. No. 13/177,028 filed Jul. 6, 2011, now U.S. Pat. No. 8,503,464, issued Aug. 6, 2013, entitled TECHNIQUES FOR EFFICIENTLY UPDATING ROUTING INFORMATION, which in turn is a non-provisional of and claims the benefit and priority under 35 U.S.C. 119(e) of U.S. Provisional Application No. 61/488,641 filed May 20, 2011. The entire contents of the 13/177,028 and 61/488,641 applications are incorporated herein by reference for all purposes.

BACKGROUND

Embodiments of the present invention relate to networking, and more particularly to techniques for updating routing table information in a network device such as a router.

A networking environment typically comprises multiple networks. The networks may be of the same or different types and may use the same or different communication protocols for communication of data. Communication of data within the networks and also between the networks is typically facilitated by network devices such as routers, switches, etc. A network device may be referred to as a node. A node may be connected to one or more other nodes. A node may also be connected to one or more networks. A network may also be referred to as a leaf.

In a typical network environment, the number of network devices (i.e., the number of nodes) is generally far less than the number of networks (i.e., the number of leaves) that are connected by the nodes. For example, the number of nodes in a network environment may be in the order of hundreds while the number of leaves or networks is typically in the order of ten thousand, hundred thousand, etc. The number of leaves in a network environment is thus typically several orders of magnitude greater than the number of nodes.

In order to facilitate communication of data, a node, such as a router, needs to know the topology of the overall network environment. The topology information is used by the node to determine how data packets received by the node are to be forwarded to facilitate communication of the data packets from the sender of the packets to the intended destination for the data packets. Various different protocols are presently used to distribute topology information between the various nodes. For example, in a link state protocol (e.g., Intermediate System-Intermediate System (IS-IS), Open Shortest Path First (OSPF)), each node in the network environment advertises connectivity information to its neighbors including information identifying links to neighboring nodes and costs associated with the links. The cost associated with a link may be based upon various different metrics such as link bandwidth, delay, etc. The cost associated with a link while carrying data in one direction may be different from the cost associated with the same link while carrying data in the opposite direction.

A node then determines an optimum route from the node to each other node in the network environment based upon the advertised information received by the node from other nodes. A Shortest Path First (SPF) algorithm (e.g., using Dijkstra's algorithm) is commonly used to determine these optimum routes. The SPF algorithm generates a shortest path tree (SPT) that is rooted at the node executing the SPF algorithm and identifies an optimum path from the root node to each other available node (which may be a router) in the network environment. An optimum path from the root node to another node may comprise intermediate nodes.

Further, a node may also "own" or advertise one or more leaves. A node owning or advertising a leaf provides connectivity to that leaf. A node may own or advertise multiple leaves. A leaf may be advertised by multiple nodes.

Information regarding nodes and leaves advertised by the nodes is used to supplement the nodes in the SPT. In this manner, the SPT is expanded to add leaves information for the nodes in the SPT. The expanded SPT is then used to determine routing information for the root node (i.e., the node generating the SPT). The routing information for the root node includes information regarding routes from the root node to one or more leaves, which may be advertised by the root node or by other nodes. For example, the routing information may include information identifying zero or more leaves advertised by the root node. For a leaf not advertised by the root node, the routing information may identify a next hop node from the root node for reaching the leaf. The next hop node may be a node advertising the leaf or some other intermediate node.

The routing information for the root node is typically stored in a routing information database in the root node. This stored information is commonly referred to as the routing information base (RIB). The information in the RIB stored by a node thus indicates routes from the node to leaves in the network environment. Since the number of leaves in a network environment can be very large, (e.g., in the tens of hundreds of thousands), the number of routes for which information is stored in the RIB is usually very large, even though the number of nodes in the network environment may be small.

When a node receives information indicating a change in the topology of the network environment, the node recalculates its SPT (by running a full or incremental SPF algorithm) and updates its RIB based upon the recalculated SPT and the leaves information. In a typical conventional implementation, as part of the RIB updates, each node and leaf in the RIB has to be visited and processed to see if information related to the node or leaf is to be updated. However, due to the very large number of leaves that are typically present in the network environment, updating the routes information in the RIB is a very time consuming process that uses valuable processing and memory resources of the node.

BRIEF SUMMARY

Embodiments of the present invention provide techniques for efficiently updating routing information in a network device such as a router. According to an embodiment of the present invention, the routing information is updated upon creation or deletion of an overlay tunnel without the network device having to regenerate a Shortest Path Tree (SPT) by performing full Shortest Path First (SPF) processing.

In one embodiment, a network device is provided that stores routing information used by the network device for forwarding data received by the network device. The network device may receive information related to an overlay tunnel between a first node and a second node, the information including a first cost metric indicative of a cost for communicating data from the first node to the second node using the overlay tunnel, wherein the first node and the second node are included in a shortest path tree (SPT) generated prior to receiving information related to the overlay tunnel. The network device may then compare the first cost metric to a second cost metric, the second cost metric indicative of a cost for communicating data from the first node to the second node using a native path. Upon determining that the first cost metric is equal to or greater than the second cost metric, the routing information may be updated in response to receiving information for the overlay tunnel without regenerating the SPT. In one embodiment, the update may be performed without executing a Shortest Path First (SPF) algorithm.

In one embodiment, the network device stores parent-child information that enables the network device to update the routing information without regenerating the SPT. The parent-child information is generated based upon the SPT, wherein, for each node in the SPT, the parent-child information comprises information related to a list of parent nodes of the node in the SPT and a list of child nodes of the node in the SPT. The network device is then configured to use the parent-child information to update the routing information without regenerating the SPT.

In one embodiment, the parent-child information further comprises, for each node in the SPT, and for each parent node included in the list of parent nodes for the node: a cost metric associated with a link for communicating data from the parent node to the node, information indicating whether the link is a native link or an overlay tunnel, and status information indicative of whether the link has the lowest associated cost for reaching the node from the parent node.

In one embodiment, the network device is configured to determine, based upon the parent-child information, a set of nodes from the SPT that are descendants of the second node. The network device may then update information in the routing information related to one or more leaves advertised by the set of nodes and the second node without regenerating the SPT.

In another embodiment, the network device is configured to determine, based upon the parent-child information, a set of one or more children of the second node that are connected to the second node by a link having the lowest associated cost for reaching the child node from the second node. The network device may then update information in the routing information related to one or more leaves advertised by the set of children nodes of the second node and the second node without regenerating the SPT.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

For purposes of this application, a node refers to a network device. Examples of network devices include routers, switches, or any device that is capable of forwarding data. A network environment may comprise one or more nodes. For purposes of this application, a leaf refers to a network. A network environment may comprise one or more leaves.

Embodiments of the present invention provide techniques for efficiently updating routing information in a network device such as a router. According to an embodiment of the present invention, information is stored identifying one or more nodes and leaves owned or advertised by the nodes. When a change occurs in a network environment, information is stored identifying one or more nodes and leaves that have changes associated with them. The routing information in the network device is then updated for only those nodes and leaves that have changes associated with them. Since the routing information is updated for those nodes and leaves that have changes associated with them and not for other nodes and leaves, updates to the routing information are performed efficiently and in reduced time.

In one embodiment, the routing information is updated upon creation or deletion of an overlay tunnel without the network device having to regenerate a Shortest Path Tree (SPT) by performing full Shortest Path First (SPF) processing.

Figure 1:
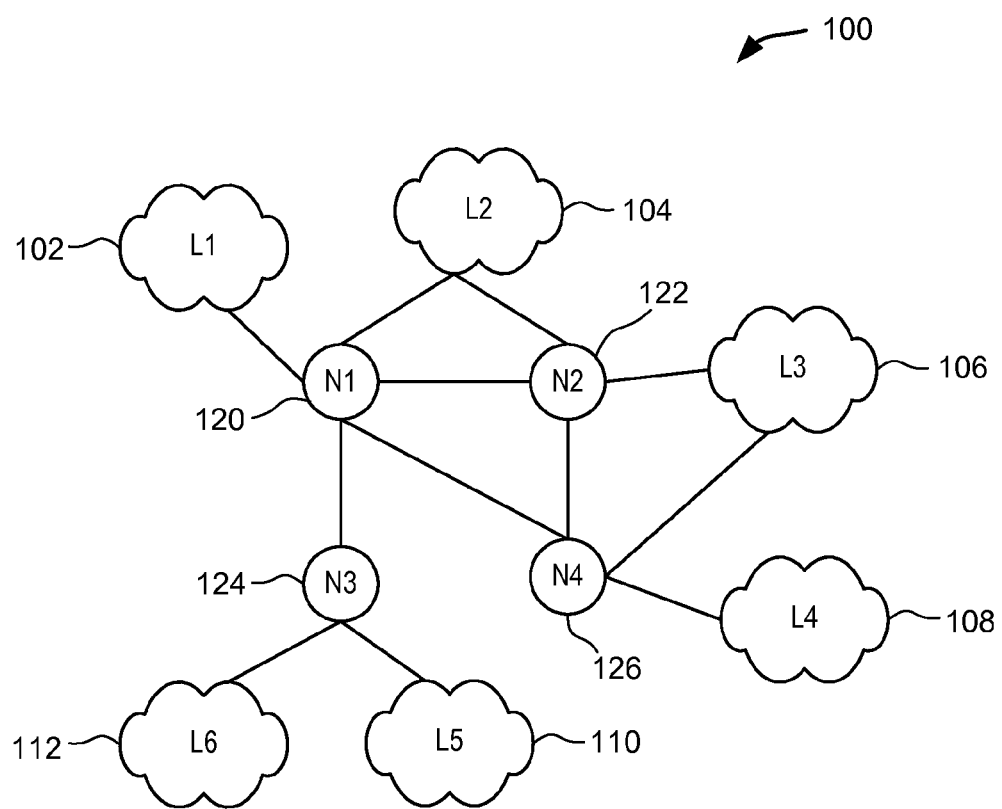
FIG. 1 is a simplified diagram of a network environment that may incorporate an embodiment of the present invention.

FIG. 1 is a simplified diagram of a network environment 100 that may incorporate an embodiment of the present invention. As depicted in FIG. 1, network environment 100 comprises a plurality of networks (also referred to as leaves) 102, 104, 106, 108, 110, and 112. Connectivity between the leaves is provided by a plurality of nodes 120, 122, 124, and 126. A node may be connected to another node or leaf via one or more links. The leaves may be represented using various prefixes such as in the form A.B.C.D, e.g., 10.1.1.1, 11.1.1.1, 20.2.2.2, etc. In IPv4, the leaves may be specified in an address/prefix length form such as 11.1.1.0/24, 12.1.1.0/24, etc. In IPv6, the leaves may be specified in an address/prefix length form such as 1112::/64, 3456::/64, etc. The same or different protocols may be used for communicating data within the leaves and also between the leaves.

The nodes provide connectivity between the various leaves. In one embodiment, each node is a network device that is configured to receive data and forward the data to facilitate transmission of the data to its intended destination leaf. Examples of a node include a router, a switch, and the like. A node may provide connectivity to one or more leaves. A leaf to which a node provides connectivity is referred to as being owned or advertised by the node. For example, for the topology depicted in FIG. 1, node N1 advertises leaves L1 and L2, node N2 advertises leaves L2 and L3, node N3 advertises leaves L5 and L6, and node N4 advertises leaves L3 and L. As is evident from the above, a single leaf may be owned or advertised by one or more nodes.

In one embodiment, in order to determine how to forward packets, each node receives topology information for the network environment. The topology information is used by the node to determine how data packets received by the node are to be forwarded to facilitate communication of the data packets from the sender of the packets to the intended destination for the data packets. Various different protocols may be used to distribute topology information between the various nodes. For example, in a link state protocol (e.g., Intermediate System-Intermediate System (IS-IS), Open Shortest Path First (OSPF)), each node in the network environment advertises connectivity information to its neighbors including information identifying links to neighboring nodes and costs associated with the links. The cost associated with a link may be based upon various different metrics such as link bandwidth, delay, etc. The cost associated with a link while carrying data in one direction may be different from the cost associated with the same link while carrying data in the opposite direction.

A node is configured to determine optimum routes from the node to the leaves in the network environment based upon the topology information received by the node from other nodes. In one embodiment, each node in network environment 100 is configured to execute a Shortest Path First (SPF) algorithm (e.g., Dijkstra's algorithm) based upon the topology information received by the node from other nodes in the network environment. The execution of the SPF algorithm generates a shortest path tree (SPT) that is rooted at the node executing the SPF algorithm and identifies an optimum path from the root node (i.e., the node executing the SPF) to each other available node in network environment 100. An optimum path from the root node to another node may comprise zero or more intermediate nodes.

The SPT is then expanded using information related to nodes and leaves advertised by the nodes. As previously indicated, a node owning or advertising a leaf provides connectivity to that leaf. A node may own or advertise multiple leaves. A leaf may be advertised by multiple nodes. Optimum routes from the root node (i.e., the node performing the processing) to the leaves are then determined using the expanded SPT. The routing information for the root node thus includes information regarding routes from the root node to one or more leaves, which may be advertised by the root node or by other nodes. For example, the routing information may include information identifying zero or more leaves advertised by the root node. For a leaf not advertised by the root node, the routing information may identify a next hop node from the root node for reaching the leaf. The next hop node may be a node advertising the leaf or some other intermediate node.

Each node stores the routing information in a database, generally referred to as the routing information base (RIB). Since the number of leaves in a network environment can be very large, (e.g., in the tens of hundreds of thousands), the number of routes for which information is stored in the RIB is usually very large, even though the number of nodes in the network environment may be small.

The RIB information may be used for various different purposes. In one embodiment, the information stored in the RIB for a node is used for programming a forwarding information base (FIB) stored by the node. The FIB stored by a node is used to program the node for making data forwarding decisions.

The information stored in the RIB for a node has to be updated as the network topology changes. An embodiment of the present invention provides improved techniques for updating the RIB information stored by the node based upon the SPT and the leaves information. For example, in one embodiment, the RIB information is updated without having to visit or process all the nodes and leaves identified in the RIB. The leaves that are affected by the topology changes may be determined and the RIB updated only for those leaves. In this manner, the RIB may be updated in a time that is proportional to the number of affected leaves and independent of the total number of leaves in the network environment. In one embodiment, the efficient update of the RIB is facilitated by special data structures stored and used by the node.

Figure 2:
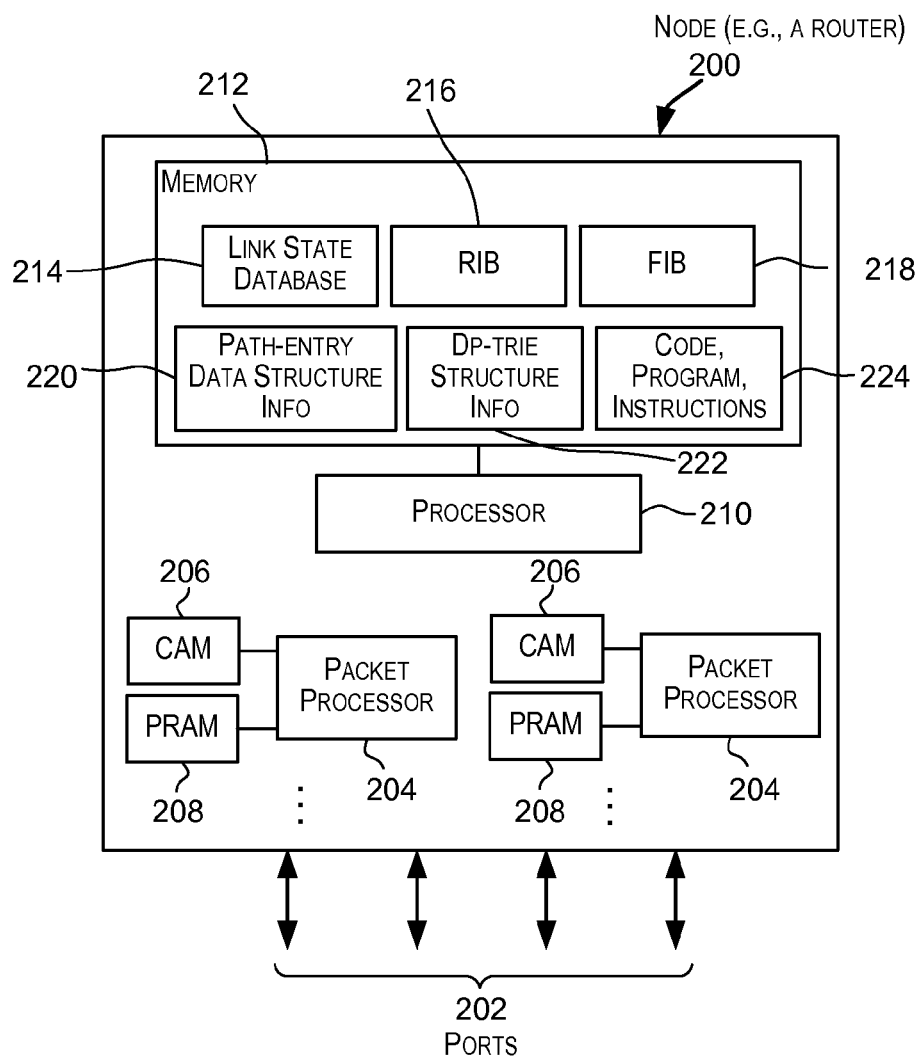
FIG. 2 depicts a simplified block diagram of a node that may incorporate an embodiment of the present invention.

FIG. 2 depicts a simplified block diagram of a node 200 that may incorporate an embodiment of the present invention. Node 200 may represent a node depicted in FIG. 1. Node 200 may be a router that is configured to forward data such as a router provided by Brocade Communications Systems, Inc. In the embodiment depicted in FIG. 2, node 200 comprises a plurality of ports 202, one or more packet processors 204, and a processor 210 with associated memory 212. The components of node 200 depicted in FIG. 2 are meant for illustrative purposes only and are not intended to limit the scope of the invention in any manner. Alternative embodiments may have more or less components.

Node 200 is configured to receive and forward data using ports 202. A port within ports 202 may be classified as an input port or an output port depending upon whether a data packet is received or transmitted using the port. A port over which a data packet is received by node 200 is referred to as an input port. A port used for communicating or forwarding a data packet from node 200 is referred to as an output port. A particular port may function both as an input port and an output port. A port may be connected by a link to another node or to a leaf. Ports 202 may be capable of receiving and/or transmitting different types of data traffic at different speeds including 1 Gigabit/sec, 10 Gigabits/sec, or more. In some embodiments, multiple ports of node 100 may be logically grouped into one or more trunks.

Upon receiving a data packet via an input port, node 200 is configured to determine an output port for the packet for transmitting the data packet from the node to another node or leaf. Within node 200, the packet is forwarded from the input port to the determined output port and transmitted from network device 200 using the output port. Packet processors 204 are programmed to perform forwarding of the data packet from an input port to an output port. Each packet processor 204 may have associated memories to facilitate packet forwarding. In one embodiment, as depicted in FIG. 2, each packet processor 204 has an associated content addressable memory (CAM) 206 and a RAM 208 for storing forwarding parameters (RAM 208 may accordingly also be referred to as a PRAM). In one embodiment, for a packet received via an input port of node 200, a packet processor 204 is configured to determine an output port of node 200 to which the packet is to be forwarded based upon information extracted from the packet. The extracted information may include, for example, the header of the received packet. In one embodiment, a packet processor 204 performs a lookup in its associated CAM 206 using the extracted information. A matching CAM entry then provides a pointer to a location in the associated PRAM 208 that stores information identifying how the packet is to be forwarded within node 200. Packet processor 204 then facilitates forwarding of the packet from the input port to the output port.

Since processing performed by packet processor 204 needs to be performed at a high packet rate in a deterministic manner, packet processor 204 is generally a dedicated hardware device configured to perform the processing. In one embodiment, packet processor 204 is a programmable logic device such as a field programmable gate array (FPGA). Packet processor 204 may also be an ASIC. Node 200 may comprise one or more packet processors 204, each with its associated RAM memories.

Node 200 also comprises a processor 210 that is configured to perform processing by executing software programs, code or instructions. In one embodiment, processor 210 is configured to control the overall working of node 200. For example, processor 210 may execute the SPF algorithm to generate an SPT, update routing information stored by node 200, update the forwarding information stored by node 200, program the packet processors and associated memories based upon the forwarding information, and other like functions. In one embodiment, processor 210 is a general purpose microprocessor such as a PowerPC, Intel, AMD, or ARM microprocessor, operating under the control of software stored in an associated memory 212.

Memory 212 is configured to store the various programs/code/instructions 224 and data constructs that are used for processing performed by processor 210. For example, memory 212 stores a link state database 214 that stores network environment topology information that is received by node 200 from other nodes in the network environment. Processor 210 may then execute an SPF algorithm that uses the information stored in link state database 214 to generate an SPT for node 200. Routing information determined from the SPT may be stored in RIB 216. RIB 216 may also store information regarding nodes and leaves advertised by the nodes.

In one embodiment, the information stored in RIB 216 is used to update the information in forwarding information base (FIB) 218 stored in memory 212. FIB 218 is then used to program node 200 for performing forwarding of data packets received by the node. For example, FIB 218 may be used to program packet processors 204 and their associated memory structures (e.g., CAM 206 and PRAM 208) for facilitating forwarding decisions.

In one embodiment, node 200 uses specialized data structures that enable efficient updating of RIB 216. According to an embodiment of the present invention, these data structures include a path-entry data structure and a dp-trie structure. Information regarding these structures is persisted in memory 212 as path-entry data structure information 220 and dp-trie structure information 222. Further details related to these structures are provided below.

Figure 3:
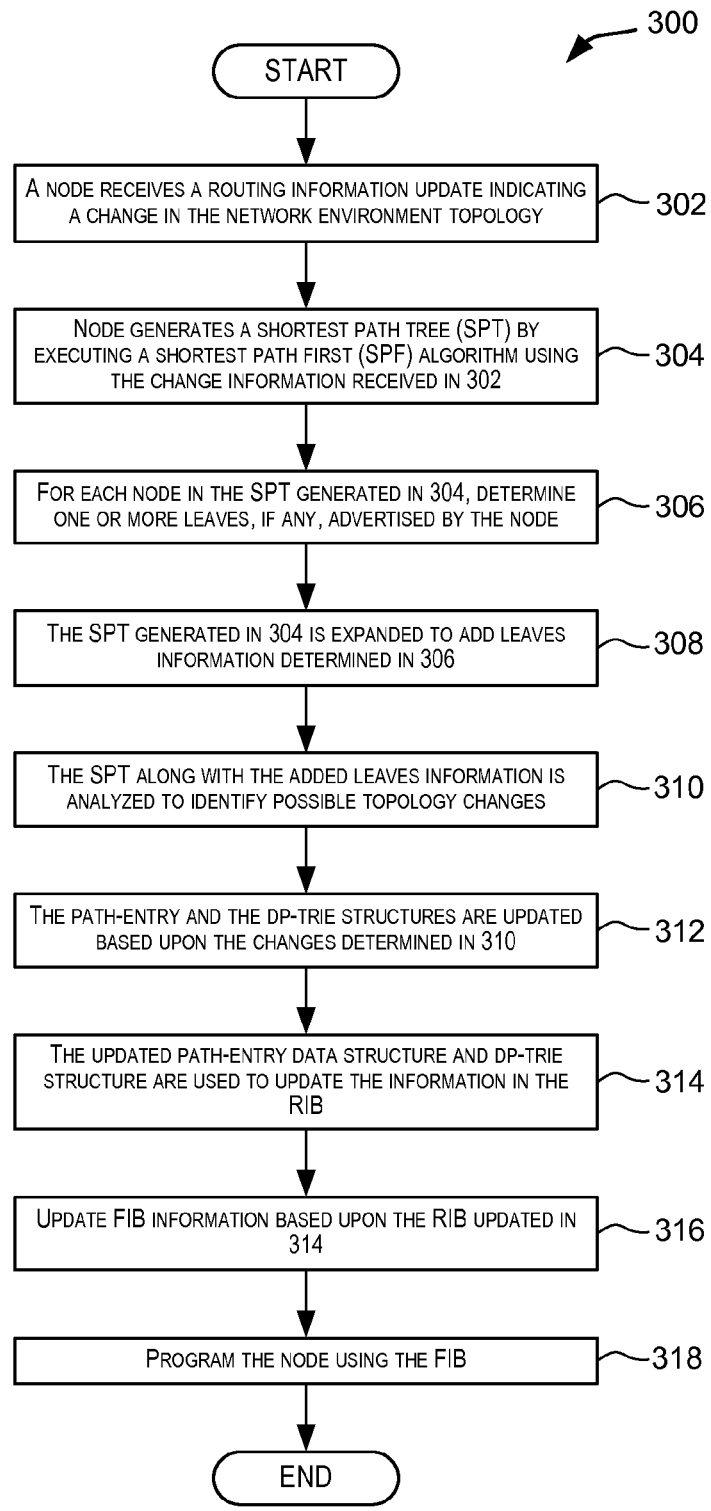
FIG. 3 depicts a high level simplified flowchart depicting a method performed by a node for processing changes in a network environment topology according to an embodiment of the present invention.

FIG. 3 depicts a high level simplified flowchart 300 depicting a method performed by a node for processing changes in a network environment topology according to an embodiment of the present invention. The processing depicted in flowchart 300 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

As depicted in FIG. 3, the method may be initiated when a node receives a routing information update indicating a change in the network environment topology (step 302). For example, if a link state protocol is being used, a link state control packet may be received in 302 identifying one or more changes to the network environment.

The node then generates a shortest path tree (SPT) by executing an SPF algorithm using the change information received in 302 (step 304). Various different SPF algorithms, including the commonly used Dijkstra's algorithm, may be used to generate the SPT in 304. Depending upon the context, either a full SPF or an incremental SPF may be executed in 304. In a full SPF execution, the entire SPT is regenerated. In an incremental SPF, incremental updates are made to a previously generated SPT. Whether to run full SPF or incremental SPF may be dependent on the information about the location of the change in the network received in 302.

The SPT calculated in 304 is rooted at the node executing the SPF algorithm and identifies an optimum path from the root node to each other available node (which may be a router) in the network environment. An optimum path from the root node to another node may comprise zero or more intermediate nodes. In calculating an optimum route from the node executing the SPF to other nodes, the SPF algorithm executed in 304 takes into account the cost metrics associated with links between the nodes in the network environment. The cost metric associated with a link between two nodes identifies the cost of communicating data from one node to another node using the link. The SPF algorithm executed by the node takes the various cost metrics into account and generates an SPT in 304 that optimizes the cost metrics information.

A node may own or advertise zero or more leaves. A node owning or advertising a leaf provides connectivity to that leaf. For each node in the SPT generated in 304, one or more leaves, if any, advertised by the node are determined (step 306). Information identifying associations between nodes and leaves may be provided by the link state update information received in 302. The nodes and associated leaves information may also be stored by the node running the SPF, for example, in link state database 214 stored by the node. The nodes and associated leaves information may also be stored in other data structures.

The SPT generated in 304 is then expanded to add leaves information determined in 306 (step 308). As part of the processing performed in 308, each node in the SPT generated in 304 may be supplemented with information identifying zero or more leaves advertised by the node. The nodes-leaves information may also include information identifying cost metrics associated with the connectivity. The cost metric associated with a link between a node and a leaf identifies the cost of communicating data from the node to the leaf using the link.

The SPT along with the leaves information is then analyzed to identify possible topology changes (step 310). Examples of topology changes that are identified in 310 may include:
(1) New node—The SPT comprises a new node that was not in a previously calculated SPT. This may be because the new node was added to the network environment, the node was previously unreachable but now is reachable, and the like.
(2) Deleted node—A node in a previously calculated SPT is no longer in the recalculated SPT. This may be due to the node being removed from the network environment, the node becoming unreachable, etc.
(3) Change in a cost metric from the root node to a node in the SPT—This indicates that the cost of reaching that node from the root node has changed.
(4) Change in next hop interface for a node—This indicates that, for a node in the SPT, the next hop interface for reaching that node from the root node has changed. This may be a result of a change in the cost metric associated with a link in the network environment, dropping of a link, and the like.
(5) Change in leaf ownership—This indicates a change in an association between a node in the SPT and a leaf. This may be due to a node advertising a new leaf, a leaf previously being advertised by a node being no longer advertised by the node, etc.
(6) Change in leaf cost from node—This indicates a change in the cost to reach a leaf advertised from a particular node (i.e., owning node to leaf cost has changed). The change may have occurred for example due to administrative changes.

Various other topology changes may also be determined from the expanded SPT.

The path-entry and the dp-trie structures are then updated based upon the changes determined in 310 (step 312). Details related to the updates that may be performed as part of step 312 are discussed below.

The updated path-entry data structure and dp-trie structure are then used to update the information in the RIB (step 314). According to an embodiment of the present invention, using the path-entry data structure and the dp-trie structure enables updates to be made to the RIB in an efficient manner. These data structures enable nodes and leaves that have been impacted by the change to be easily identified without having to process all the nodes and leaves. Accordingly, updates to the RIB can be made only for those nodes and leaves that have changes associated with them. Accordingly, updates to the RIB may be made without having to process all the nodes and leaves identified in the RIB. This reduces the number of updates and the amount of information that has to be updated in the RIB. This in turn enables the update process to be performed in a timely and efficient manner. In one embodiment, the RIB may be updated in a time that is proportional to the number of affected leaves and independent of the total number of leaves in the network environment. The efficient update of the RIB is facilitated by special data structures stored and used by the node.

The updated RIB information may then be used to update information in the FIB stored by the node (step 316). The node may then be programmed for facilitating data forwarding decisions using the updated FIB information (step 318).

Although the various steps in FIG. 3 are depicted as being performed in a serialized manner, two or more of the steps may be performed in parallel or in an iterative manner. For example, steps 304, 306, 308, 310, and 312 may be performed iteratively. For example, while the SPT is being built and expanded with leaves information, topology changes may be identified, and the path-entry data structure and the dp-trie structure updated based upon the determined changes.

Figure 4:
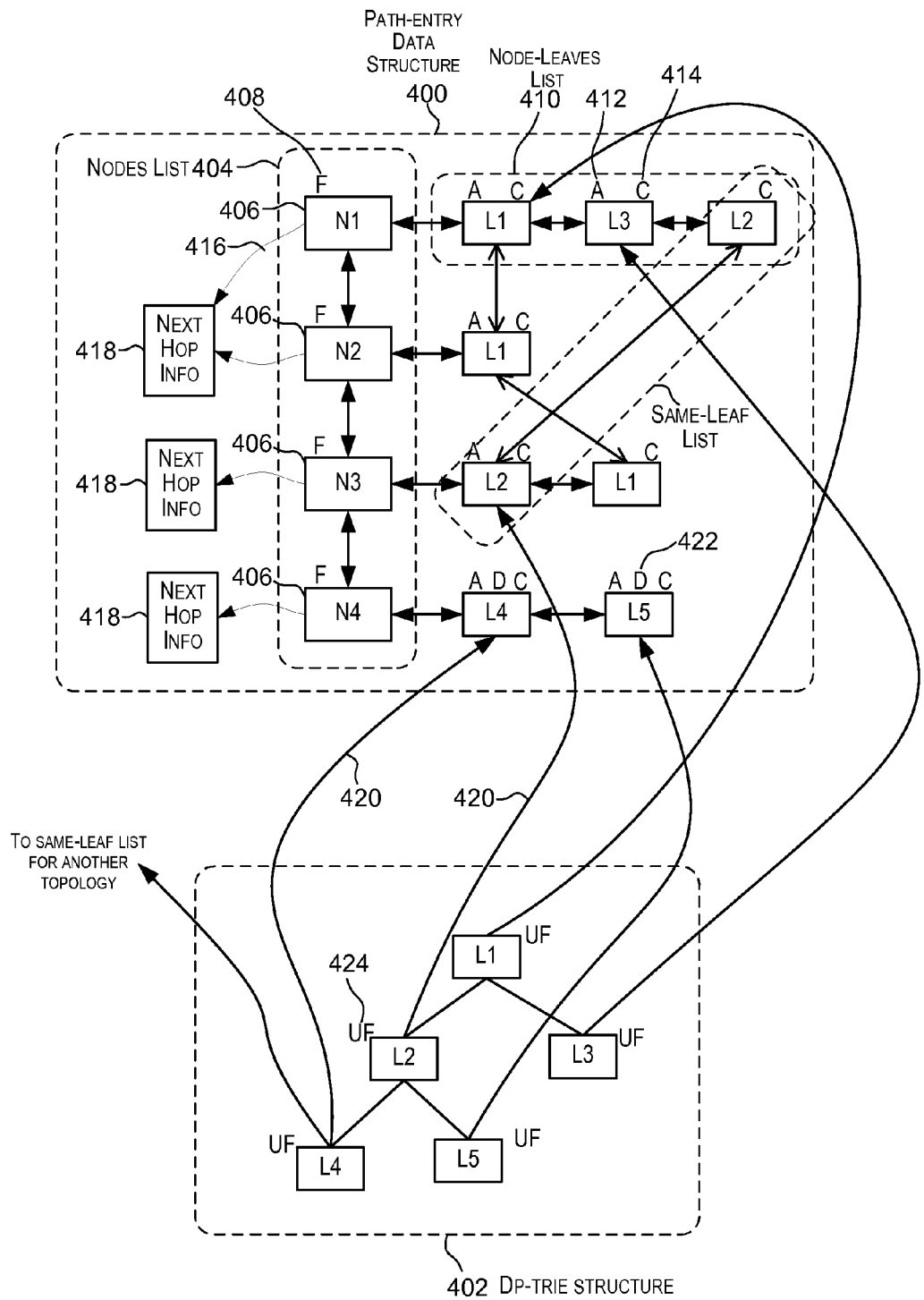
FIG. 4 depicts a path-entry data structure and a dp-trie structure that are used by a node for making updates to the RIB according to an embodiment of the present invention.

FIG. 4 depicts a path-entry data structure 400 and a dp-trie structure 402 that are used by a node for making updates to the RIB according to an embodiment of the present invention. The data structures may be persisted in memory 212 of node 200 depicted in FIG. 2. During processing, the data structures may be loaded into the RAM of the node. The data structures depicted in FIG. 4 are not intended to limit the scope of the invention as recited in the claims. In alternative embodiments, other data structures may be used.

As depicted in FIG. 4, path-entry data structure 400 comprises a list 404 of node entries 406, each node entry 406 identifying a node. List 404 will be referred to as the nodes list 404. For example, in the embodiment depicted in FIG. 4, nodes list 404 comprises four node entries identifying nodes N1, N2, N3, and N4. The nodes identified by the node entries in nodes list 404 may be routers. In one embodiment, the nodes list 404 may also comprise a node entry for the node performing the processing.

Various pieces of information may be associated with each node entry. In one embodiment, flag information (F) 408 is associated with each node entry 406. Flag information 408 for a node entry identifies changes, if any, associated with the node represented by the node entry. Flag information 408 associated with a node entry may comprise one or more flags, each flag corresponding to a particular change and indicating if the particular change is associated with the node identified by the node entry.

In one embodiment, the flags in flag information 408 are set based upon the analysis of regenerated SPT and associated nodes-leaves information. For example, the flag information may be set in step 310 of flowchart 300 in FIG. 3. Types of changes that may be identified by the flags include whether the SPT comprises a new node that was not in a previously calculated SPT, whether a node in a previously calculated SPT is no longer in the recalculated SPT, whether there is a change in the cost metric from the root node to another node in the SPT, whether there is a change in the next hop interface for the root node, whether there is a change in an association between a node (any node in the SPT) and a leaf, whether there is a change in the cost to reach the advertised leaf from a particular node, and the like. Separate flags may be specified for each of the changes. For example, in one embodiment, the following flags may be provided for flags information associated with a node entry representing a node:
NODE_FLAG_NOCHG that is set to 1 if there is no change for the node specified by the node entry, else set to 0;

NODE_FLAG_NEW_NODE that is set to 1 if the node specified by the node entry is newly added to the SPT, else set to 0;

NODE_FLAG_NODE_DELETE that is set to 1 if the node specified by the node entry is no longer in the SPT, else set to 0;

NODE_FLAG_MET_CHG that is set to 1 if the cost metric from the root node to the node specified by the node entry is changed, else set to 0;

NODE_FLAG_NEXTHOP_CHG that is set to 1 if there is a change in the next hop interface for reaching the node specified by the node entry from the root node, else set to 0; and NODE_FLAG_LEAF_CHG that is set to 1 if there is a change in an association between the node specified by the node entry and a leaf, else set to 0.

Other types of flags may be provided in alternative embodiments to specify other types of changes. The flags information in path-entry data structure 400 is used to quickly identify nodes that have changes associated with them and for which the RIB is to be updated. The flags information enables the RIB update to be performed in a node-centric manner thereby increasing the efficiency and speed of the RIB update process.

As depicted in FIG. 4, each node entry 406 may be associated with a list of leaves 410. The list of leaves associated with a node entry represents a set of leaves that are advertised by the node identified in the node entry. In one embodiment, the leaves associated with a node entry are arranged as a linked list. For purposes of explanation, a list of leaves associated with a node entry is referred to as a "node-leaves list." Accordingly, a node-leaves list for a node entry identifies zero or more leaves that are advertised by the node identified in the node entry. Each leaf entry in a node-leaves list is referred to as a leaf instance.

In one embodiment, path-entry data structure 400 is constructed such that, given a node, a node entry in nodes list 404 specifying that node can be accessed, and the accessed node entry can be used to access its associated node-leaves list. A node-leaves list is such that it is possible to traverse the leaf instances in the list. Further, given a reference to a leaf instance in a node-leaves list, it is possible to access the node entry with which the node-leaves list is associated (i.e., given a leaf instance, it is possible to determine the node owning the leaf instance). In one implementation, a node-leaves list may be constructed using a doubly linked list, with the head of the linked list associated with the node entry identifying a node owning the leaf instances in the list.

A particular leaf may be advertised by multiple nodes, i.e., the same leaf may be connected to multiple nodes. Accordingly, it is possible that there may be multiple instances of the same leaf in path-entry data structure 400, each leaf instance included in a node-leaves linked list of a node entry specifying a node owning the leaf. For example, as depicted in FIG. 4, leaf L1 is owned or advertised by nodes N1, N2, and N3. As a result, there are three leaf instances for leaf L1 in path-entry data structure 400 depicted in FIG. 4: one leaf instance for L1 appears in the node-leaves list associated with a node entry specifying node N1; another leaf instance for L1 appears in the node-leaves list associated with a node entry specifying N2; and a third leaf instance for L1 appears in the node-leaves list associated with a node entry specifying N3.

In one embodiment, a list is maintained linking all leaf instances of the same leaf. In this manner, if a particular leaf is exposed by multiple nodes, links are stored between the leaf instances thereby creating a linked list of the particular leaf instances. A list comprising leaf instances of the same leaf is referred to as a "same-leaf list". A same-leaf list may be traversed using the links in the list. A same-leaf list may comprise one or more leaf instances for the same leaf. Path-entry data structure 400 may comprise zero or more same-leaf lists. In the embodiment depicted in FIG. 4, there are two same-leaf lists corresponding to leaves L1 and L2.

Since the leaf instances in a same-leaf list are also members of node-leaves lists associated with node entries, given a leaf L, the same-leaf list comprising instances of leaf L can be used to determine the one or more nodes that advertise leaf L. This can be done without having to traverse the node-leaves list associated with each of the nodes.

In one embodiment, a cost metric "C" 414 is associated with each leaf instance in path-entry data structure 400. Cost metric 414 associated with a leaf instance measures the cost of reaching that leaf from the root node in the SPT (i.e., the node doing the processing) via the node owning the leaf instance. In one embodiment, the cost of reaching a leaf instance is the sum of the cost of reaching the node owning the leaf instance from the root node and the cost of reaching the leaf from the owning node. For example, in FIG. 4, the cost associated with leaf instance L3 in node-leaves list for node N1 is the sum of the cost of reaching node N1 from the root node (i.e., the node performing the processing) and the cost of reaching leaf L3 from node N1. In this manner, cost metrics are calculated and associated with the leaf instances in path-entry data structure 400.

As discussed above, a same-leaf list links leaf instances of the same leaf. For each same-leaf list in path-entry data structure 400, an ordering is imposed on the leaf instances in the same-leaf list based upon the cost metrics associated with individual leaf instances in the list. In one embodiment, a same-leaf list is ordered such that the one or more leaf instances with the lowest associated cost metric are positioned at the head of the same-leaf list. For example, in one embodiment, only the one or more leaf instances with the lowest associated costs may be positioned at the head of the same-leaf list but no ordering is imposed on the other leaf instances in the same-leaf list. It is possible that multiple leaf instances in a same-leaf list may have the same lowest cost.

As indicated above, it is possible that a leaf instance may be advertised by different nodes. Further, the cost of reaching the leaf from the root node via the different advertising nodes may be the same. For example, this may happen in a scenario where, for two different nodes N1 and N2 advertise a leaf L. Let us assume that the cost of reaching N1 from the root node is C1, the cost of reaching node N2 from the root node is C2, the cost of reaching leaf L from N1 is C3, and the cost of reaching leaf L from N2 is C4. It may be the case that (C1+C3) is equal to (C2+C4). Such scenarios are referred to as "anycast scenarios".

In one embodiment, an active/inactive flag 412 may be associated with each leaf instance in path-entry data structure 400. In each same-leaf list in path-entry data structure 400, the one or more leaf instances with the lowest associated cost metric in the same-leaf list are marked as "active" (i.e., the active/inactive flag associated with these leaf instances is set to "active"). A node-leaves list associated with a node entry may comprise zero or more leaf instances that are marked as active. In one embodiment, each node-leaves list in path-entry data structure 400 is ordered such that the leaf instances in the node-leaves list that are marked as active are positioned at the head of the node-leaves list closer to the node entry. A node-leaves list may comprise one or more leaf instances marked as active.

In one embodiment, a disabled flag "D" 422 may be associated with a leaf instance. When flag 422 is set for a leaf instance, it indicates that the particular leaf instance has been disabled. Further description related to how this flag is used for updating the RIB is provided below.

Each node entry in path-entry data structure 400 also has an associated next hop pointer 416 pointing to next hop information 418 for the node identified in the node entry. For a node entry specifying a node N, the next hop information 418 associated with the node entry identifies a next hop node (e.g., identified by an IP address and link identifier) from the root node for reaching node N from the root node. In one embodiment, the next hop information for a node identifies information identifying a link (e.g., using a link ID) from the root node to the next hop node. The next hop information is typically determined from the SPT tree generated by the root node. Next hop pointers 416 for two different node entries 406 in nodes list 404 identifying two different nodes may point to the same next hop information if the next hop from the root node for reaching the two different nodes is the same.

In one embodiment, in addition to identifying the next hop node, the next hop node information 418 for a node entry may also comprise information identifying the number of hops (equal cost paths) from the root node to reach the node identified in the node entry; a list of the hops may also be identified.

Dp-trie structure 402 stores information identifying leaves. Each leaf is typically identified using a prefix. The form of prefix may be different in different networking protocols. In IPv4, the leaves may be specified in an address/prefix length form such as 11.1.1.0/24, 12.1.1.0/24, etc. In IPv6, the leaves may be specified in an address/prefix length form such as 1112::/64, 3456::/64, etc. For purposes of this application, reference to the term "IP" is intended to refer generically to one or more different versions of the IP protocol such as IPv4, IPv6, etc. In one embodiment, the leaves or prefixes in the dp-trie structure are organized in the form of a tree with parent-child relationships between the leaves. According to an embodiment of the present invention, dp-trie structure 402 comprises links to leaf instances in path-entry data structure 400. In one embodiment, for each leaf entry in dp-trie structure 402, a link 420 (referred to as a trie-to-path link) is stored from the leaf entry in dp-trie structure 402 to a same-leaf list comprising one or more instances of the same leaf. If there is only one leaf instance in the same-leaf list for a leaf L, then the trie-to-path link 420 associated with the leaf L entry in dp-trie structure 402 points to that single leaf instance. For example, in FIG. 4, there is only one leaf instance for leaf L5, and the trie-to-path link 420 associated with the leaf entry of L5 in dp-trie structure 402 points to the single leaf instance (advertised by node N4).

If there are multiple instances of the leaf in the same-leaf list for the leaf (e.g., due to the leaf being owned or advertised by multiple nodes), then the trie-to-path link associated with the leaf entry in dp-trie structure 404 points to one of the leaf instances in the same-leaf list. In one embodiment, the trie-to-path link points to the leaf instance in the same-leaf list with the lowest associated cost metric. For example, in the example depicted in FIG. 4, the same-leaf list for leaf L1 comprises multiple instances of the leaf (e.g., one leaf instance advertised by node N1, another advertised by node N2, and yet another advertised by node N3). In such a scenario, the trie-to-path link associated with the leaf entry for L1 in dp-trie structure 402 points to a leaf instance in the same-leaf list with the lowest associated cost metric. In the example in FIG. 4, this is the leaf instance advertised by node N1.

As previously discussed, in one embodiment, the leaf instances in a same-leaf list may be ordered such that the one or more leaf instances with the lowest associated cost are positioned at the head of the same-leaf list. In such an embodiment, a trie-to-path link for a leaf in the dp-trie structure points to the leaf instance at the head of the same-leaf list, which represents the leaf instance with the lowest associated cost metric.

The trie-to-path links provide a way for accessing same-leaf lists in path-entry data structure 400 from dp-trie structure 402. For a leaf entry in database 402, a trie-to-path link 420 associated with the entry can be used to access the same-leaf list comprising leaf instances of the leaf in path-entry data structure 400. In one embodiment, a trie-to-path link provides a link to a leaf instance with the lowest associated cost metric.

In one embodiment, each leaf entry in dp-trie structure 402 may have an update flag "UF" 424 associated with it. The update flag for a lead entry may be set to reflect a change associated with the leaf. The update flag is thus used to easily identify leaves that have changes associated with them and for which the RIB needs to be updated. In this manner, rather than processing all the leaves, leaves that have associated changes can be identified and information for only those leaves appropriately updated in the RIB.

A change list (not shown in FIG. 4) comprising one or more node entries 406 may also be maintained as part of path-entry data structure 400. A node entry from node-leaves list 404 is added to the change list if there is a change associated with the node specified by the node entry. The node entries in the change list thus identify nodes that have one or more changes associated with them. The change list is then used to update the information in the RIB, as described below in more detail. Maintenance of a change list enables easy and efficient identification of nodes for which the information in the RIB needs to be updated.

The nodes and leaves in a network environment, such as network environment 100 depicted in FIG. 1, may be configured according to different topologies, with each topology having a specific configuration of the leaves and routers. Each topology thus identifies a specific arrangement of nodes and leaves. The same leaf or node could be part of different topologies. Likewise, a leaf or a node may be part of one topology but not part of another topology. The link state information for one topology may be different from the link state information for another topology. The cost metrics associated with the nodes and the leaves may also be different in different topologies.

In a network environment comprising multiple topologies, if a node participates in multiple topologies, then the node is configured to run a separate SPF algorithm for each topology in which the node participates and generate a separate SPT for each topology. The node is also configured to maintain a separate path-entry data structure for each topology. The node may however share a single dp-trie structure between the multiple topologies. For example, if a node participates in two different topologies T1 and T2, dp-trie structure 402 depicted in FIG. 4 may be shared between the topologies; however a separate path-entry data structure 400 is maintained for each topology. In such an embodiment, each dp-trie structure entry for a leaf stores multiple trie-to-path pointers, each for a specific topology. For example, for a leaf in the dp-trie structure (e.g., leaf L4 depicted in FIG. 4), one tri-to-path pointer associated with the leaf entry may point to a same-leaf list for a first topology while a second tri-to-path pointer associated with the leaf entry may point to another same-leaf list structure for a second topology, and so on.

Typically, when there are multiple topologies, one of the topologies is preferred to others. For example, between two topologies, one may be designated as the "upper" or preferred topology while the other may be designated as the "lower"

topology. The preference information is used for making updates to the RIB, as discussed below. When information is received identifying a change in the network environment, the change information typically identifies the topology to which the change applies. This information is then used to perform processing for the specified topology. Sometimes the change information may indicate changes to multiple topologies, in which case processing is performed for the multiple topologies, for example, a node involved in two different topologies may become disabled.

The information stored by path-entry data structure 400 and dp-trie structure 402 is updated as changes to the network environment topology are determined. For example, flag information 408 associated with the node entries in nodes list 404 is updated to indicate changes, if any, associated with the nodes specified by the node entries. For example, if it is determined that a new node is added to the SPT then a new node entry 406 is added to nodes list 404 in path-entry data structure 400, the newly added entry specifying the newly added node. The NODE_FLAG_NEW_NODE flag associated with the node entry may be set to 1. If a particular node in a preexisting path-entry data structure is now determined to be deleted, then the NODE_FLAG_NODE_DELETE flag associated with the node entry for the node may be set to 1. If it is determined that the cost metric of reaching a node from the root node has changed then the NODE_FLAG_MET_CHG flag associated with the node entry for the node may be set to 1. If it is determined that the next hop interface for a node in the path-entry data structure has changed then the NODE_FLAG_NEXTHOP_CHG flag associated with the node entry for the node may be set to 1. If it is determined that an association between a node and a leaf has changed, then the NODE_FLAG_LEAF_CHG associated with the node entry for the node may be set to 1. In this manner, based upon the analysis of the SPT and the leaves information (performed in step 310 of FIG. 3), flags information associated with the node entries in the path-entry data structure is updated in step 312 in FIG. 3. As another example, if the cost metric associated with a node or a leaf has changed, the information in path-entry data structure 400 may be updated to reflect the changes. Further details related to processing performed in steps 310, 312, and 314 in FIG. 3 are provided below. In all above cases the node entry will be added to the change list for updating the associated changes to RIB.

Figure 5A:
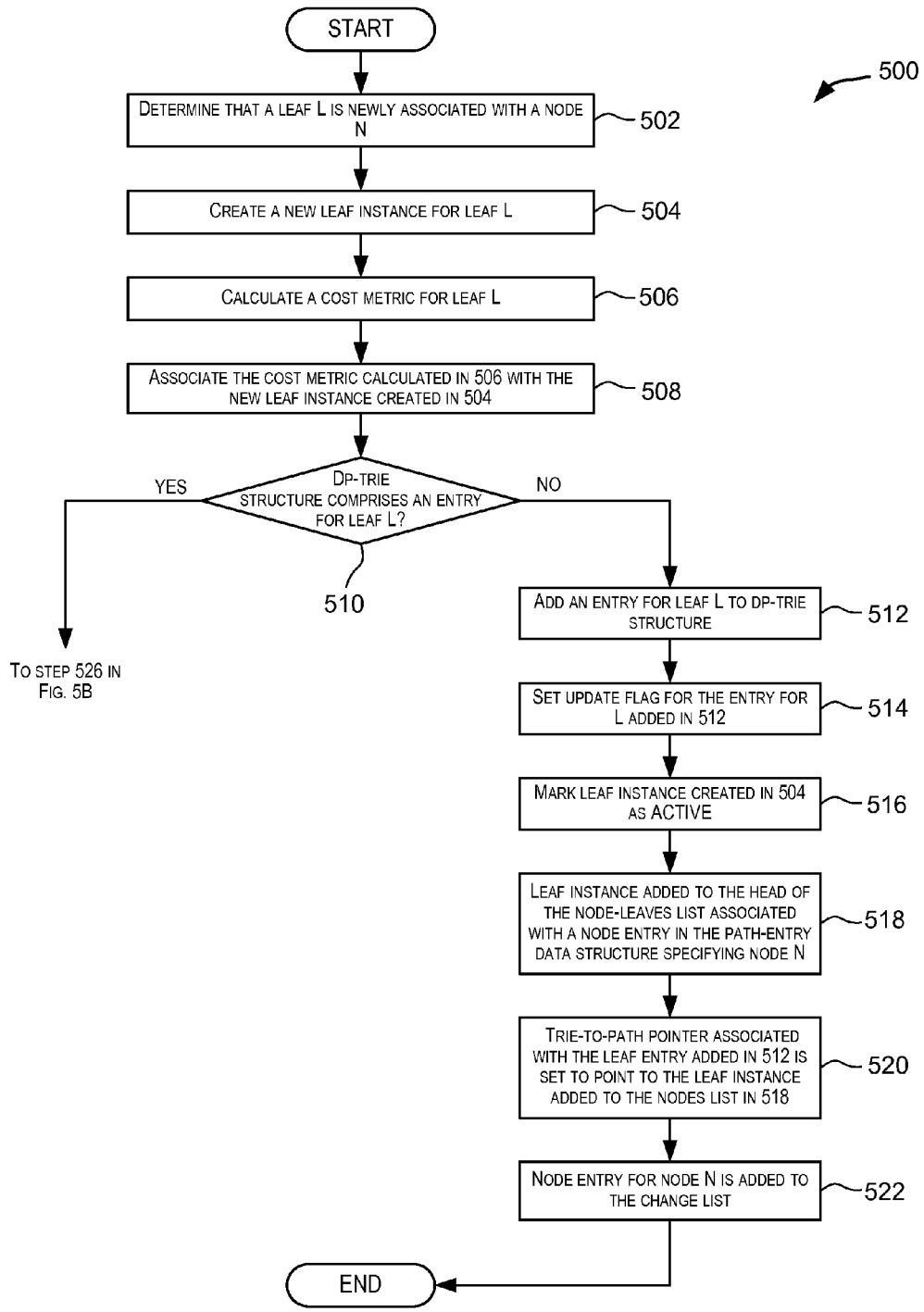
FIGS. 5A and 5B depict a high level simplified flowchart 500 depicting a method performed by a node for updating the path-entry data structure and the dp-trie structure upon determining that a leaf has been newly associated with a node according to an embodiment of the present invention.
Figure 5B:
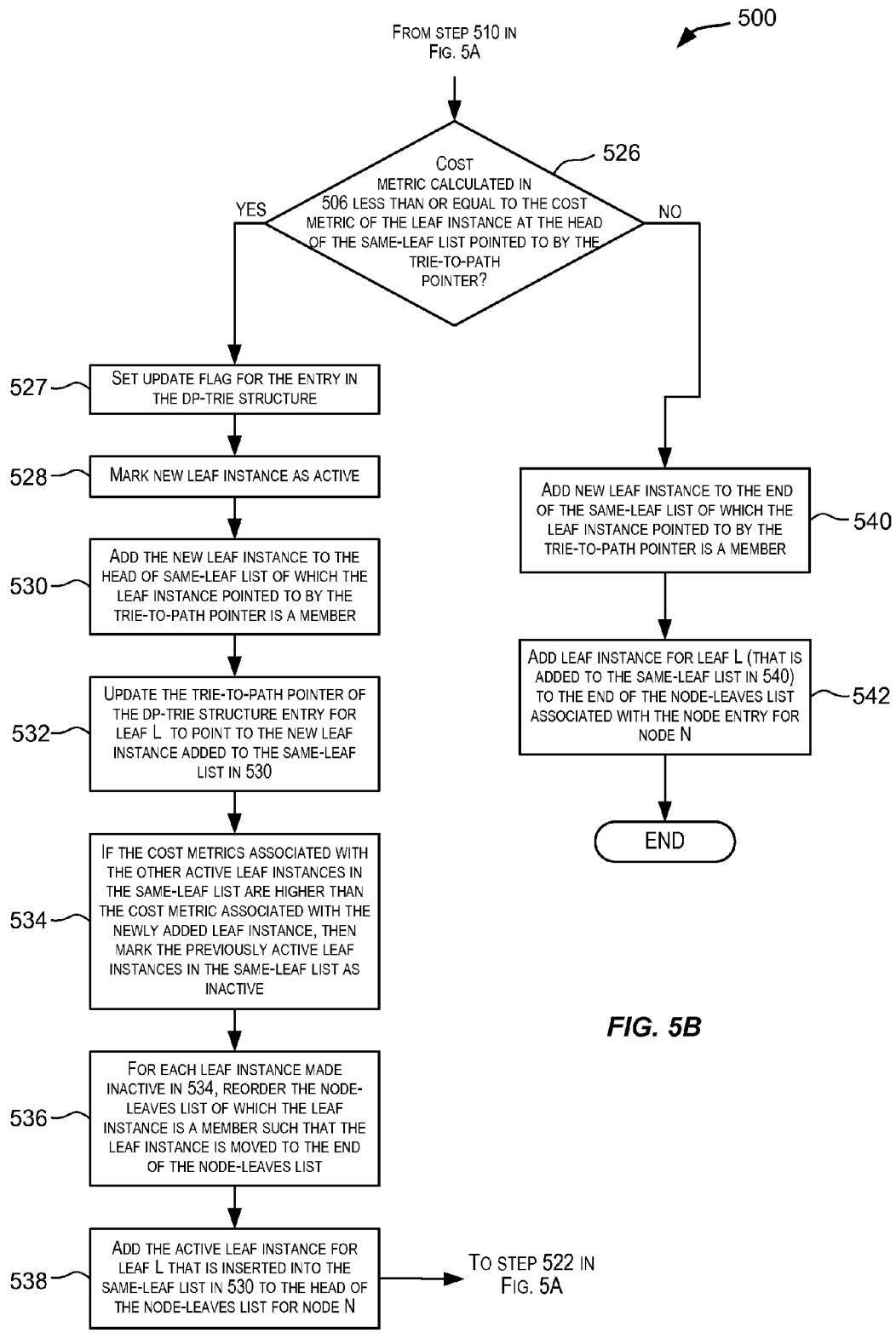

FIGS. 5A and 5B depict a high level simplified flowchart 500 depicting a method performed by a node for updating the path-entry data structure and the dp-trie structure upon determining that a leaf has been newly associated with a node. The processing depicted in flowchart 500 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

As depicted in FIG. 5A, a determination is made that a leaf L is newly associated with a node N (step 502). Accordingly, it is determined in 502 that node N owns or advertises a new leaf L. As part of 502, the NODE_FLAG_LEAF_CHG flag for the node entry specifying node N may be set to 1 indicating a change in an association between a node and a leaf. Leaf N may be identified using a prefix such as IPv4 address/prefix length or IPv6 address/prefix length.

A new leaf instance is created for leaf L (step 504). A cost metric is calculated for the leaf L (step 506) and associated with the newly created leaf instance (step 508). In one embodiment, the cost metric is the cost of reaching leaf L from the root node (i.e., the node performing the processing) via node N. In one embodiment, the cost metric is the sum of the cost to reach node N from the root node (which may be calculated during SPF execution) and the cost to reach leaf L from node N.

Dp-trie structure 402 is then checked to see if leaf L already exists in the dp-trie structure (step 510). If it is determined in 510 that leaf L does not exist in the dp-trie structure, then an entry for leaf L is added to the dp-trie structure (step 512). An "update" flag is set for the entry for leaf L that is added to the dp-trie structure in 512 (step 514). The leaf instance created in 504 is marked as active (step 516). The active leaf instance is then added to the head of the node-leaves list associated with a node entry in the path-entry data structure specifying node N in the path-entry data structure (step 518). The trie-to-path pointer associated with the dp-trie structure entry added in 512 is then set to point to the newly added leaf instance (step 520). The node N is then added to the "change list." (step 522).

If it is determined in 510 that the dp-trie structure already comprises an entry for leaf L, the cost metric calculated for the leaf instance in 506 is then compared to cost metric associated with the leaf instance pointed to by the trie-to-path pointer of the dp-trie structure entry for leaf L (step 526). Since the trie-to-path pointer points to the leaf instance with the lowest associated cost metric in the same-leaf list and one that is accordingly marked as active, the comparison performed in 526 is done to see if the new leaf instance should also be marked as active. If it is determined in 526 that the cost metric determined in 506 is lower than (i.e., better) or the same as the cost metric associated with the leaf instance pointed to by the trie-to-path pointer, an update flag is set for the corresponding entry in the dp-trie structure (step 527). The new leaf instance is marked as active (step 528) and added to the head of same-leaf list of which the leaf instance pointed to by the trie-to-path pointer is a member (step 530). The trie-to-path pointer of the dp-trie structure entry for leaf L is then updated to point to the new leaf instance added to the same-leaf list in 530 (step 532). If the cost metrics associated with the other active leaf instances in the same-leaf list are higher than the cost metric associated with the newly added leaf instance, then the previously active leaf instances in the same-leaf list are marked as inactive (step 534). For each leaf instance made inactive in 534, the node-leaves list of which the leaf instance is a member is reordered such that the leaf instance is moved to the end of the node-leaves list (step 536). The active leaf instance for leaf L that is inserted into the same-leaf list in 530 is then added to the head of the node-leaves list for node N in the path-entry data structure (step 538). The node N is then added to the change list per step 522.

If it is determined in 526 that the cost metric determined in 506 for the new leaf instance is higher than (i.e., not better) the cost associated with the leaf instance pointed to by the trie-to-path pointer, then the new leaf instance is added to the end of the same-leaf list of which the leaf instance pointed to by the trie-to-path pointer is a member (step 540). The leaf instance for leaf L that is added to the same-leaf list in 540 is then added to the end of the node-leaves list associated with the node entry specifying node N in the path-entry data structure (step 542).

Figure 6:
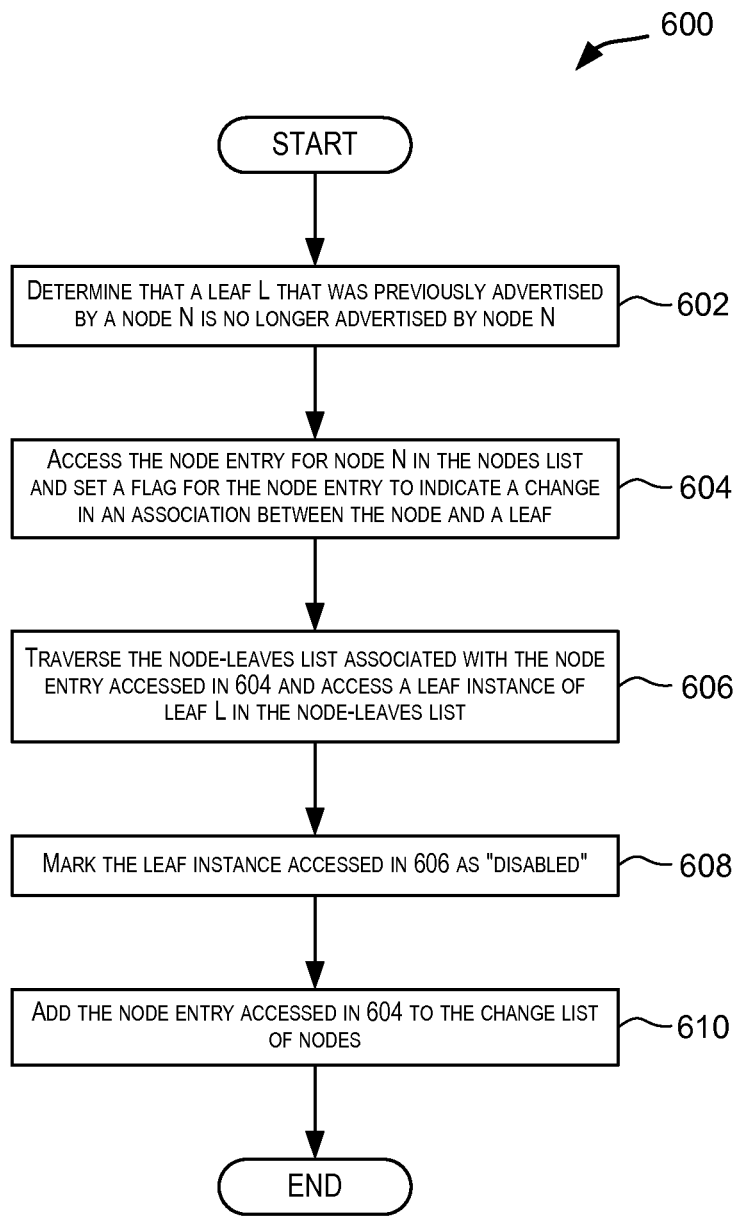
FIG. 6 is a high level simplified flowchart depicting a method performed by a node upon determining that a previous association between a node and a leaf is no longer valid according to an embodiment of the present invention.

FIG. 6 is a high level simplified flowchart 600 depicting a method performed by a node upon determining that a previous association between a node and a leaf is no longer valid. The processing depicted in flowchart 600 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

As depicted in FIG. 6, a determination is made that a leaf L that was previously advertised by a node N is no longer advertised by node N (step 602). The node entry for node N in the nodes list is accessed and the NODE_FLAG_LEAF_CHG flag for the node entry is set to 1 indicating a change in an association between a node and a leaf (step 604). The node-leaves list associated with the node entry accessed in 604 (i.e., the node entry specifying node N) is then traversed to access a leaf instance of leaf L in the node-leaves list (step 606). The leaf instance accessed in 606 is marked as "disabled" (step 608). The node entry accessed in 604 is added to the change list of nodes (step 610).

Figure 7A:
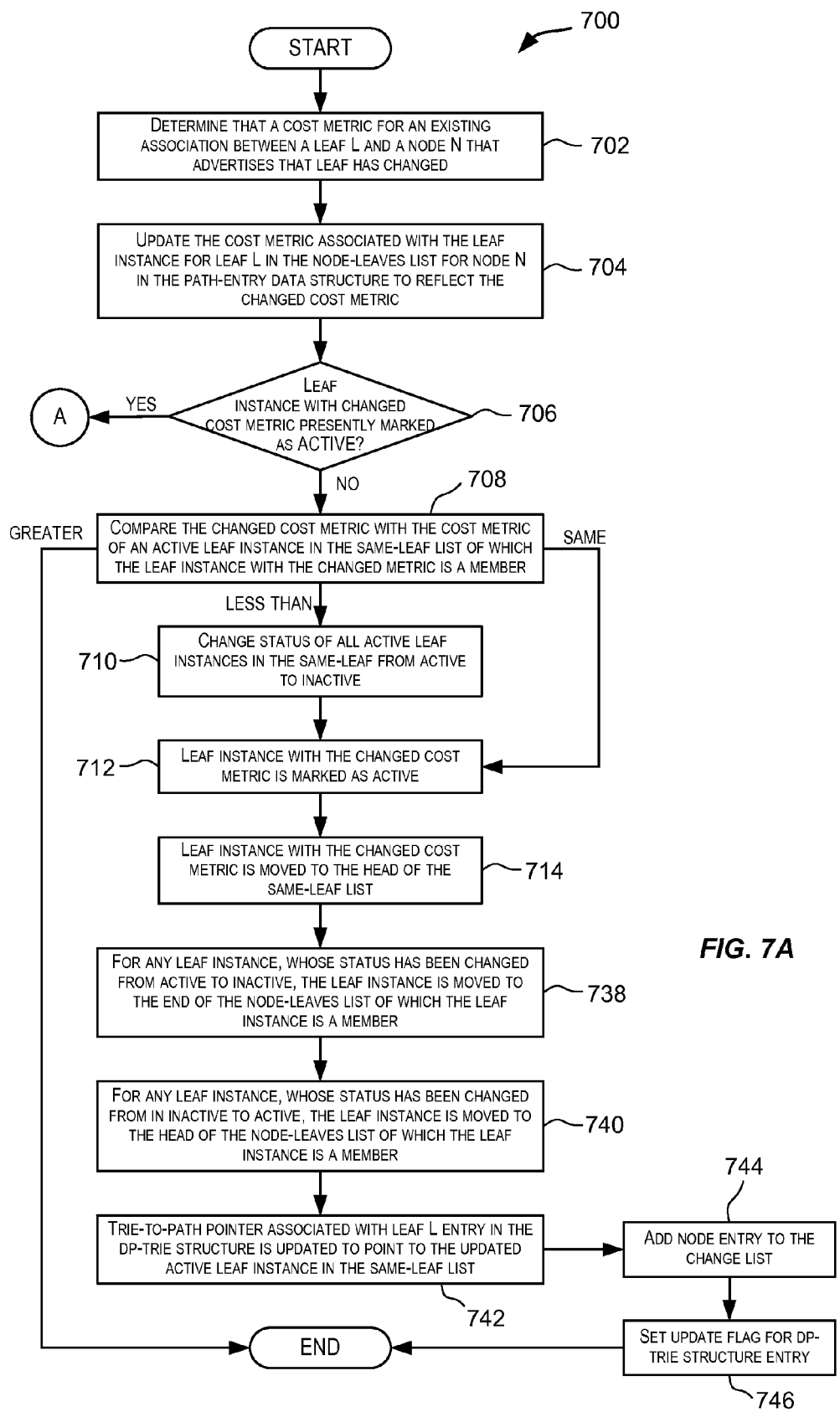
FIGS. 7A and 7B depict a high level simplified flowchart depicting a method performed by a node upon determining that the cost metric associated with an existing association between a node and a leaf has changed according to an embodiment of the present invention.
Figure 7B:
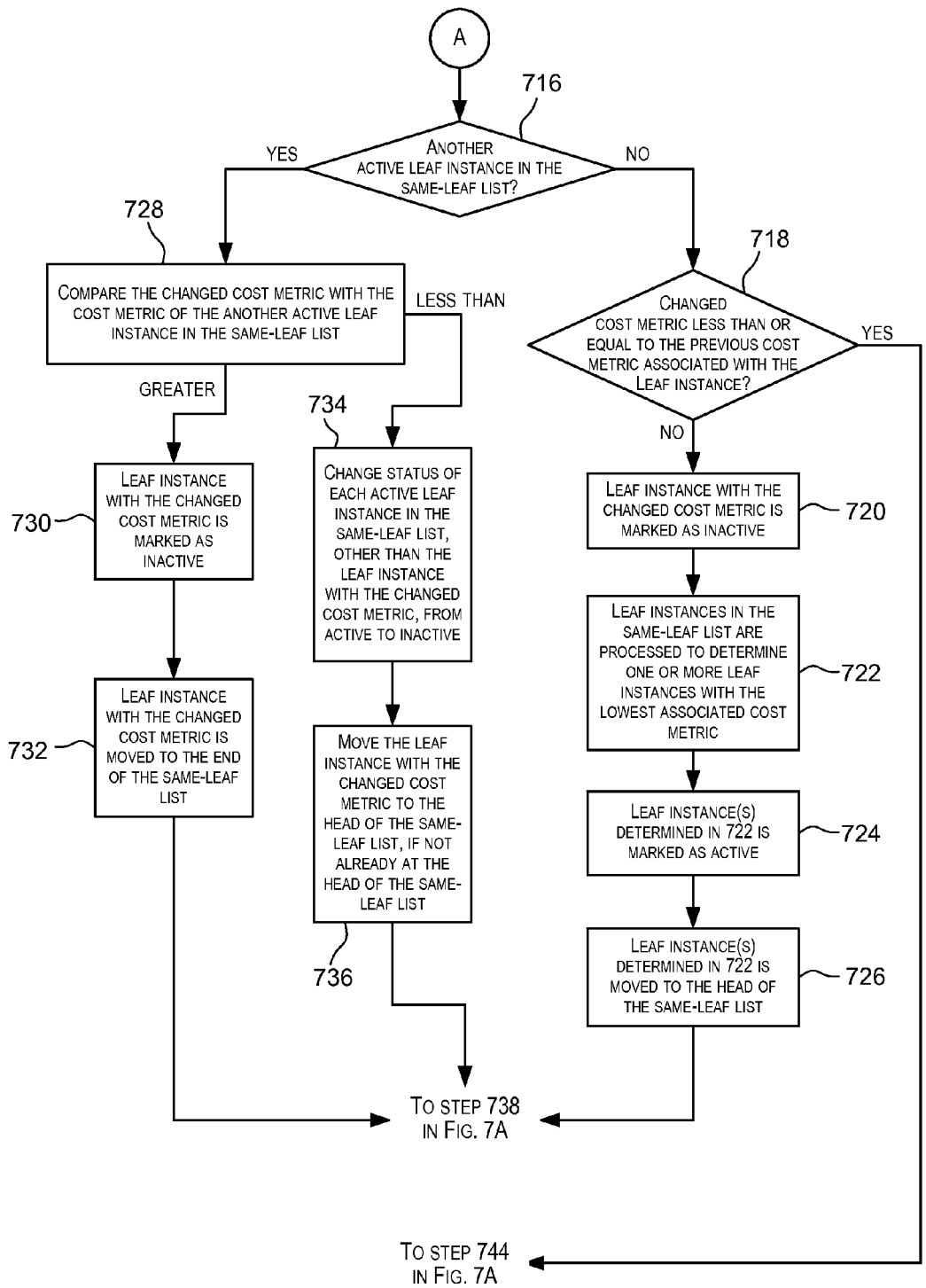

FIGS. 7A and 7B depict a high level simplified flowchart 700 depicting a method performed by a node upon determining that the cost metric associated with an existing association between a node and a leaf has changed. The processing depicted in flowchart 700 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

The cost metric for a leaf advertised by a node is the sum of the cost of reaching the owning node from the root node and the cost of reaching the leaf from the owning node. Accordingly, the cost metric associated with a leaf for a node may be changed due to a change in the cost of reaching the owning node from the root node, a change in the cost of reaching the leaf from the owning node, or changes in both costs.

As depicted in FIG. 7A, a determination is made that a cost metric for an existing association between a leaf L and a node N that owns that leaf has changed (step 702). The cost metric associated with the leaf instance for leaf L in the node-leaves list associated with the node entry for node N in the path-entry data structure is updated to reflect the changed cost metric (step 704).

The leaf instance for leaf L, now associated with the changed cost metric, is then checked to see if it is presently marked as active (step 706). If it is determined in 706 that the leaf instance with the changed cost metric is not presently marked as active, the changed cost metric is compared with the cost metric associated with an active leaf instance in the same-leaf list of which the leaf instance with the changed metric is a member (step 708).

The comparison in 708 can yield one of the following three results: (1) the changed cost metric is greater than the cost metric associated with the active leaf instance; (2) the changed cost metric is less than (i.e., is better) the cost metric associated with the active leaf instance; or (3) the changed cost metric is the same as the cost metric associated with the active leaf instance. If the comparison in 708 yields result (1), no further processing is done. If the comparison in 708 yields result (2), then all the active leaf instances that are presently marked as active in the same-leaf list of which the leaf instance with the changed cost metric is a member are marked as inactive (step 710). The leaf instance with the changed cost metric is marked as active (step 712) and moved to the head of the same-leaf list (step 714). If the comparison in 708 yields result (3), then processing continues with step 712 described above.

Referring back to step 706, if it is determined that the leaf instance with the changed cost metric is presently marked as active in its same-leaf list, then a determination is made to see if there are any other one or more active leaf instances in the same-leaf list (step 716 in FIG. 7B). The check in 716 is performed since there could be multiple active leaf instances in a same-leaf list.

If is determined in 716 that there are no other active leaf instances in the same-leaf list other than the leaf instance with the changed cost metric, a check is made to see if the changed cost metric is less than or equal to the previous cost metric associated with the same leaf instance (step 718). If it is determined in 718 that the changed cost metric is less than or equal to the previous cost metric then processing continues with step 744 in FIG. 7A. If it is determined in 718 that the changed cost metric is greater than the previous cost metric, then it means that the leaf instance may no longer have the lowest cost metric in the same-leaf list. The leaf instance with the changed cost metric is marked as inactive (step 720). The leaf instances in the same-leaf list are processed to determine one or more leaf instances with the lowest associated cost metric (step 722). The one or more leaf instances (multiple if they all have the lowest associated cost metric) determined in 722 are then marked as active (step 724) and moved to the head of the same-leaf list (step 726). Processing then continues with step 738 in FIG. 7A.

Referring back to step 716, if it is determined that at least one other leaf instance in the same-leaf list is marked as active, then the changed cost metric is compared with the cost metric associated with the other active leaf instance (step 728). The comparison in 728 can yield one of the following two results: (1) the changed cost metric is greater than the cost metric associated with the other active leaf instance; (2) the changed cost metric is less than (i.e., is better) the cost metric associated with the other active leaf instance. It should be noted that the changed cost metric cannot be the same as the cost metric associated with the other active leaf instance, since this implies that there was no change in the cost metric associated with the leaf L and node N.

If the comparison in 728 yields a result of (1), the leaf instance with the changed cost metric is marked as inactive (step 730) and moved to the end of the same-leaf list (step 732). Processing then continues with step 738 in FIG. 7A.

If the comparison in 728 yields a result of (2), the status of each active leaf instance in the same-leaf list, other than the leaf instance with the changed cost metric, is changed from active to inactive (step 734). The leaf instance with the changed cost metric is moved to the head of the same-leaf list, if not already at the head of the same-leaf list (step 736). Processing then continues with step 738 in FIG. 7A.

Referring back to FIG. 7A, for any leaf instance, whose status has been changed from active to inactive as part of the processing performed in flowchart 700, the leaf instance is moved to the end of the node-leaves list of which the leaf instance is a member (step 738). For any leaf instance, whose status has been changed from inactive to active as part of the processing performed in flowchart 700, the leaf instance is moved to the head of the node-leaves list of which the leaf instance is a member (step 740). The trie-to-path pointer associated with leaf L entry in the dp-trie structure is updated to point to the head leaf instance of the same-leaf list (step 742). The node entry is then added to the change list (step 744). An update flag is set for the dp-trie structure entry (step 746).

Figure 8:
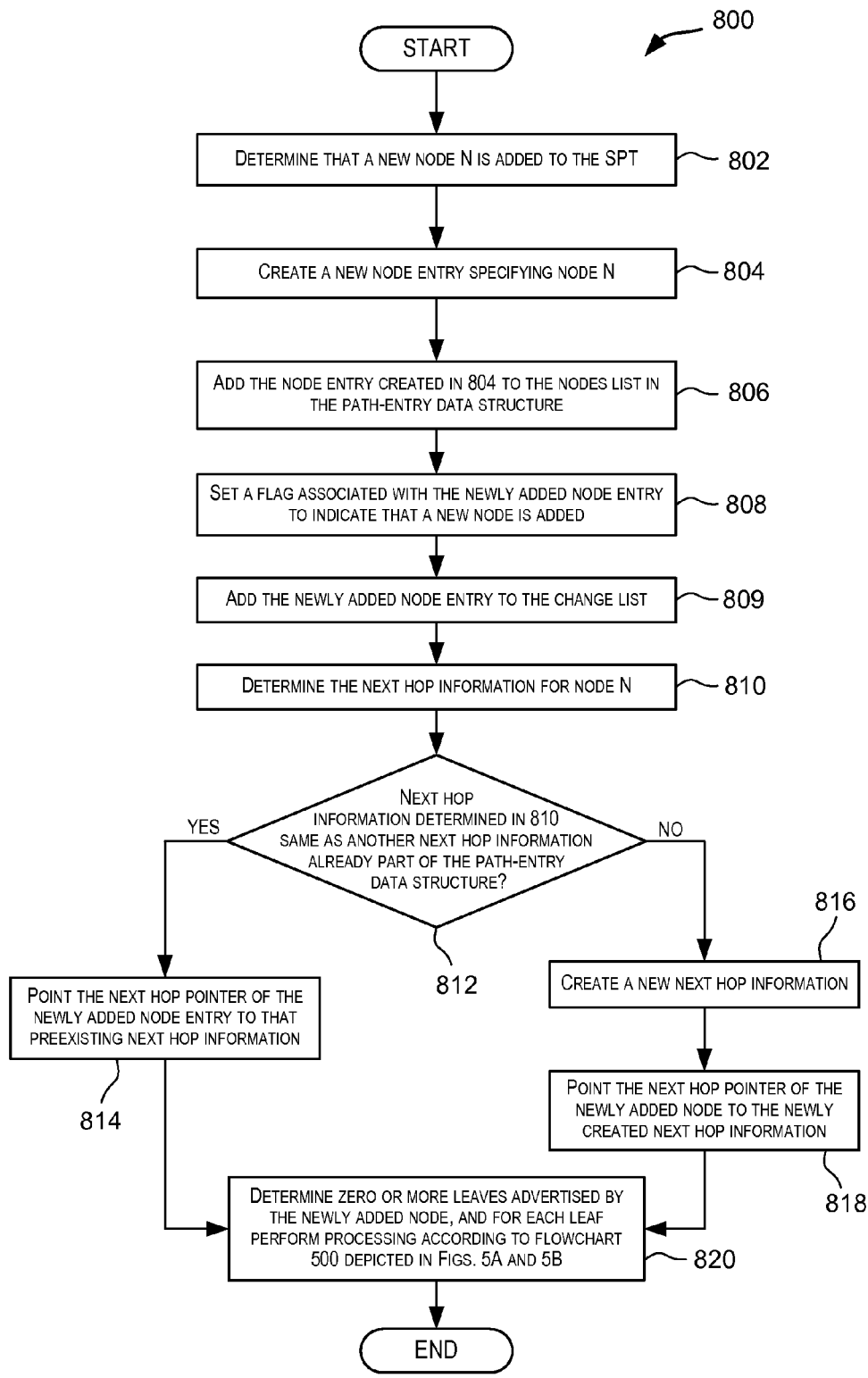
FIG. 8 depicts a high level simplified flowchart depicting a method performed by a node upon determining that a new node has been added to the SPT according to an embodiment of the present invention.

FIG. 8 depicts a high level simplified flowchart 800 depicting a method performed by a node upon determining that a new node has been added to the SPT. The processing depicted in flowchart 800 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

A determination is made that a new node N is added to the SPT generated by the node performing the processing (step 802). A new node entry is created identifying node N (step 804) and the node entry is added to the nodes list (step 806). A change flag associated with the newly added node entry is set to indicate that a new node is added (step 808). For example, the NODE_FLAG_NEW_NODE flag may be set to 1. The newly added node entry is added to the change list (step 809). The next hop information for node N is then determined (step 810). A determination is made to see if next hop information determined in 810 is the same as another next hop information already part of the path-entry data structure (step 812). If it is determined in 812 that the next hop information determined in 810 is the same as another next hop information already part of the path-entry data structure, then the next hop pointer of the newly added node entry is made to point to that preexisting next hop information (step 814), else a new next hop information is created (step 816) and the next hop pointer of the newly added node is pointed to the newly created next hop information (step 818).

The newly added node may advertise zero or more leaves. Accordingly, zero or more leaves advertised by the node are determined and, for each leaf, processing is performed according to flowchart 500 depicted in FIGS. 5A and 5B (step 820). Processing then ends.

Figure 9:
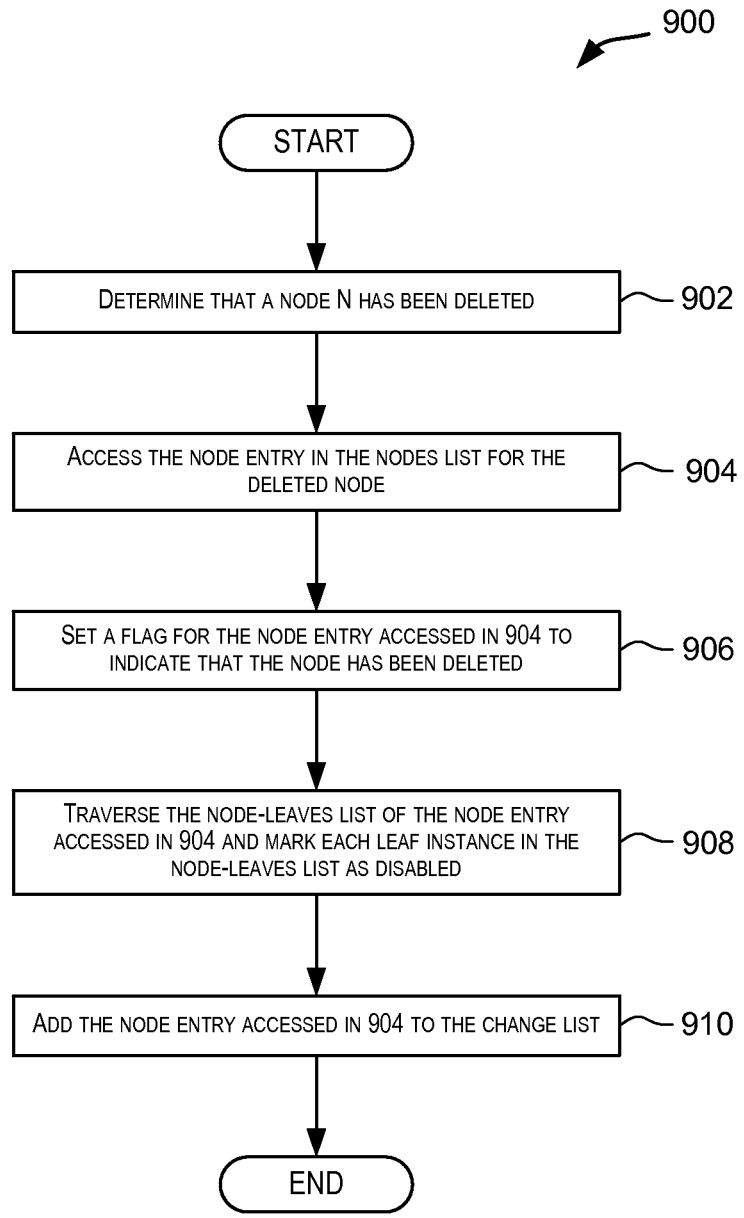
FIG. 9 depicts a high level simplified flowchart depicting a method performed by a node upon determining that a node present in a previously computed SPT is not a part of the presently computed SPT according to an embodiment of the present invention.

FIG. 9 depicts a high level simplified flowchart 900 depicting a method performed by a node upon determining that a node present in a previously computed SPT is not a part of the presently computed SPT. The processing depicted in flowchart 900 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

A determination is made that a node N has been deleted (step 902). The node entry in the nodes list for the deleted node is accessed (step 904) and a flag set for the node entry indicating that the node has been deleted (step 906). For example, the NODE_FLAG_NODE_DELETE flag may be set to 1. The node-leaves list of the node entry accessed in 904 is then traversed and each leaf instance in the node-leaves list is marked as disabled (step 908). The node entry identifying node N is then added to the change list (step 910).

Figure 10:
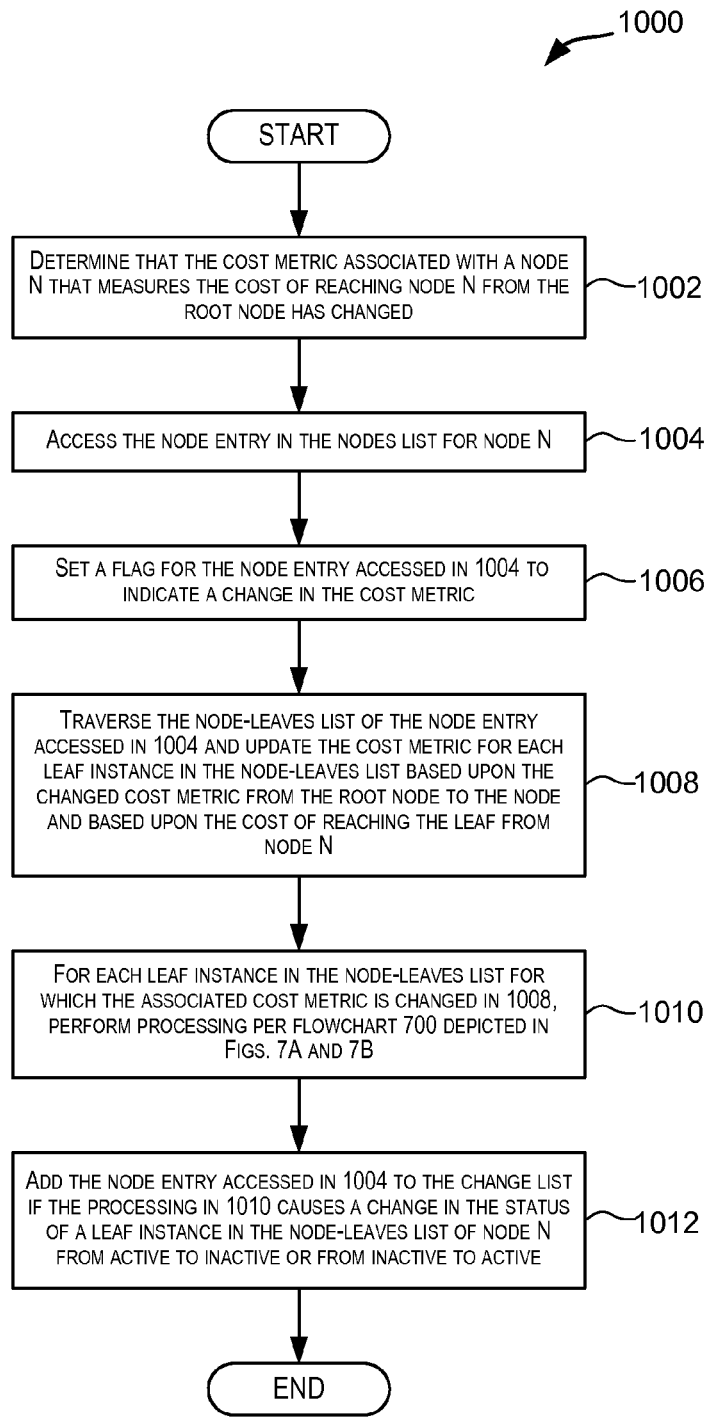
FIG. 10 depicts a high level simplified flowchart depicting a method performed by a node upon determining that a cost metric for reaching the node from the root node has changed according to an embodiment of the present invention.

FIG. 10 depicts a high level simplified flowchart 1000 depicting a method performed by a node upon determining that a cost metric for reaching the node from the root node has changed. The processing depicted in flowchart 1000 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

As depicted in FIG. 10, a determination is made that the cost metric associated with a node N that measures the cost of reaching node N from the root node (i.e., the node performing the processing) has changed (step 1002). The node entry in the nodes list for node N is accessed (step 1004) and a flag set for the node entry indicating a change in the cost metric (step 1006). For example, NODE_FLAG_MET_CHG flag associated with the node entry may be set to 1. The node-leaves list of the node entry accessed in 1004 is then traversed and the cost metric for each leaf instance in the node-leaves list is updated based upon the changed cost metric from the root node to the node and based upon the cost of reaching the leaf from node N (step 1008). The processing in 1008 may or may not change the cost metric associated with a leaf instance in the node-leaves list of node N. For each leaf instance in the node-leaves list for which the associated cost metric is changed, processing is performed per flowchart 700 depicted in FIGS. 7A and 7B (step 1010). The node entry accessed in 1004 (i.e., the node entry specifying node N) is then added to the change list if the processing in 1010 causes a change in the status of a leaf instance in the node-leaves list of node N from active to inactive or from inactive to active (step 1012).

Figure 11:
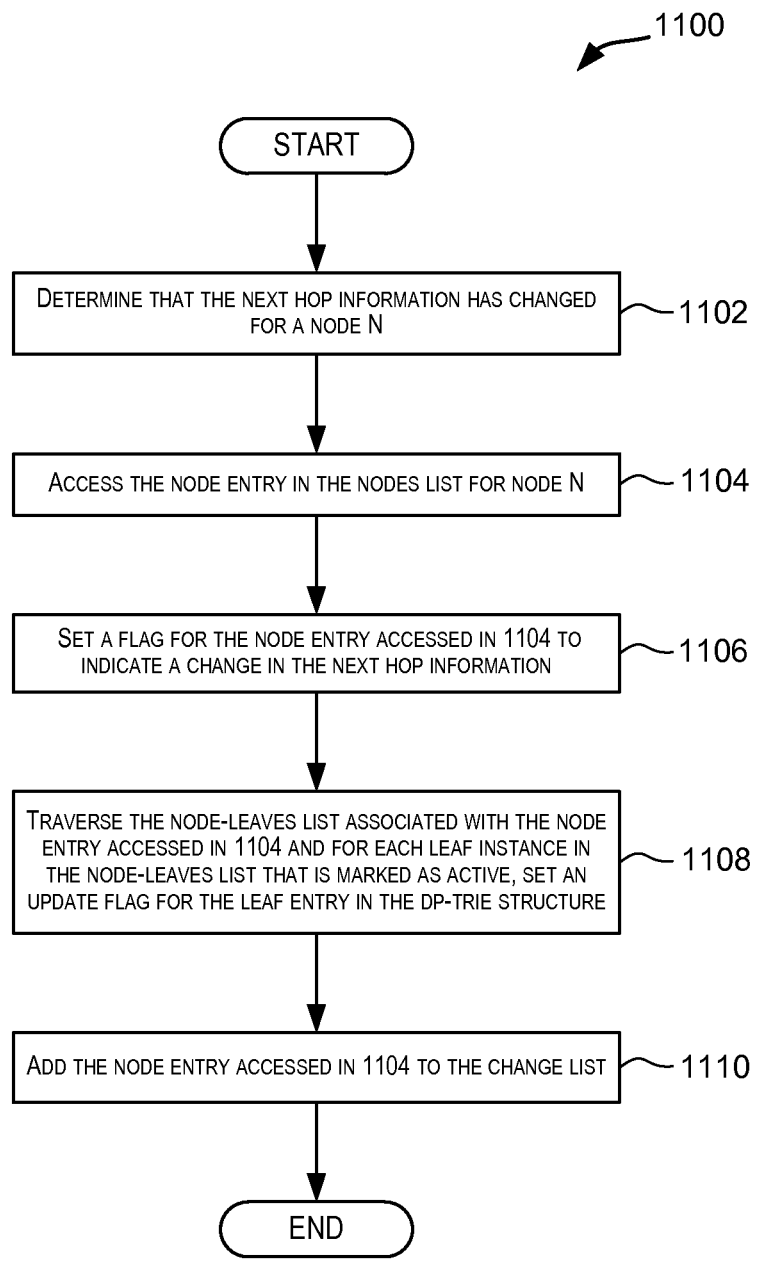
FIG. 11 depicts a high level simplified flowchart depicting a method performed by a node upon determining that the next hop information has changed for a node according to an embodiment of the present invention.

FIG. 11 depicts a high level simplified flowchart 1100 depicting a method performed by a node upon determining that the next hop information has changed for a node. The processing depicted in flowchart 1100 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

As depicted in FIG. 11, a determination is made that the next hop information has changed for a node N (step 1102). A node entry in the nodes list specifying the node N is accessed (step 1104). A flag associated with the node entry accessed in 1104 is set to indicate a change in the next hop information (step 1106). For example, the NODE_FLAG_NEXTHOP_CHG associated with the node entry may be set to 1. The node-leaves list associated with the node entry accessed in 1104 (i.e., the node entry specifying node N) is then traversed and for each leaf instance in the node-leaves list that is marked as active, an update flag is set for the leaf entry in the dp-trie structure (step 1108). The node entry accessed in 1104 for node N is then added to the change list (step 1110).

Figure 12:
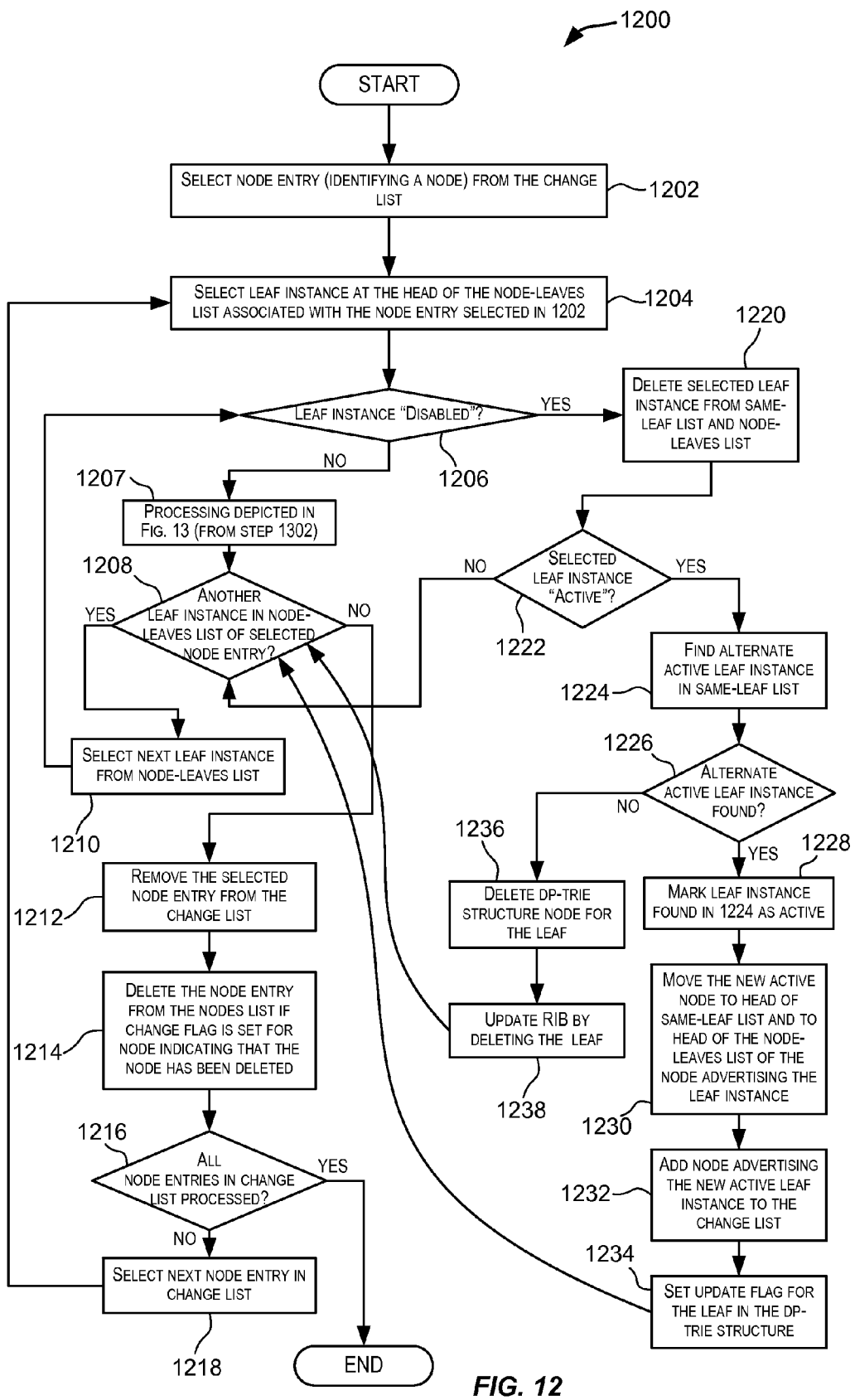
FIG. 12 depicts a high level simplified flowchart depicting a method performed by a node for processing leaf instances marked as disabled in the path-entry data structure according to an embodiment of the present invention.

As described above, in the process of updating path-entry data structure 400, one or more leaf instances in the path-entry data structure may be marked as "disabled." FIG. 12 depicts a high level simplified flowchart 1200 depicting a method performed by a node for processing leaf instances marked as disabled in the path-entry data structure according to an embodiment of the present invention. The processing depicted in flowchart 1200 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

Processing is performed by traversing the change list and taking appropriate actions for each node entry in the change list. As depicted in flowchart 1200, processing begins by selecting a first node entry from the change list, the node entry identifying a node (step 1202). The leaf instance at the head of the node-leaves list for the selected node entry is then selected (step 1204). A check is then made to see if the leaf instance selected in 1204 is marked as disabled (step 1206).

If it is determined that the selected leaf instance is not marked as disabled, then processing continues with step 1302 in FIG. 13 (step 1207) and described below. After completion of the processing depicted in FIG. 13, processing is performed to select the next leaf instance in the node-leaves list. As part of this processing, a check is made to see if there is another leaf instance in the node-leaves list of the selected node entry that has not yet been processed (step 1208). If an unprocessed leaf instance exists then the next leaf instance from the node-leaves list is selected (step 1210) and processing continues with step 1206. If it is determined in 1208 that there is no remaining unprocessed leaf instance, it implies that all the leaf instances in the nodes list for the selected node entry in the change list have been processed. The node entry is removed from the change list (step 1212). The selected node entry is then deleted from the nodes list if a change flag is set for the node entry indicating that the node identified by the node entry has been deleted (e.g., if the NODE_FLAG_NODE_DELETE flag has been set for the node entry) (step 1214).

Processing is then performed to select the next node entry in the change list. As part of this processing, a check is made to see if all the node entries in the change list have been processed (step 1216). If all node entries are not processed, then the next unprocessed node entry in the change list is selected (step 1218) and processing continues with step 1204. If it is determined in 1216 that all node entries in the change list have been processed, then processing ends.

If it is determined in 1206 that the selected leaf instance is marked as disabled, the leaf instance is deleted from the node-leaves list and the same-leaf list (step 1220). A check is made to see if the selected deleted leaf instance was marked as active (step 1222). If the selected leaf instance is determined in 1222 to be not active, processing then continues with step 1208.

If the selected leaf instance is determined in 1222 to be active, then processing is performed to find another (alternate) active leaf instance (i.e., excluding the selected leaf instance) from among members of the same-leaf list of which the selected leaf instance was a member (step 1224). A determination is made if another leaf instance could be determined as the active leaf instance (step 1226). If the selected leaf instance was the only leaf instance in the same-leaf list, then it indicates that there are no other leaf instances that could be marked as active. If it is determined in 1226 that another leaf instance could be determined in 1224 as the active leaf instance, then that leaf instance is marked as active (step 1228). The alternate active leaf instance found in 1224 is moved to the head of the same-leaf list and also to the head of the node-leaves list of the node owning the newly marked active alternate leaf instance (step 1230). The node owning the newly selected active leaf instance is added to the change list (step 1232). The update flag is set for the dp-trie structure entry for the leaf (step 1234). Processing then continues with step 1208.

If it is determined in 1226 that another active leaf instance could not be found, then the entry in dp-trie structure for the leaf is deleted (step 1236). Since an active leaf instance could not be found, this implies that there is no occurrence of the same leaf in the path-entry data structure and as a result the leaf is deleted from the dp-trie structure in 1236. The RIB is then updated for the deleted leaf (step 1238). As part of 1238, the leaf prefix is deleted from the RIB. Processing then continues with step 1208.

After the path-entry data structure and dp-trie structure have been updated based upon the changes and processing for leaf instance marked as disabled has been performed, the path-entry data and dp-trie structures are used to update the RIB. FIG. 13 depicts a high level simplified flowchart 1300 depicting a method performed by a node for updating the RIB according to an embodiment of the present invention. The processing depicted in flowchart 1300 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2.

Figure 13:
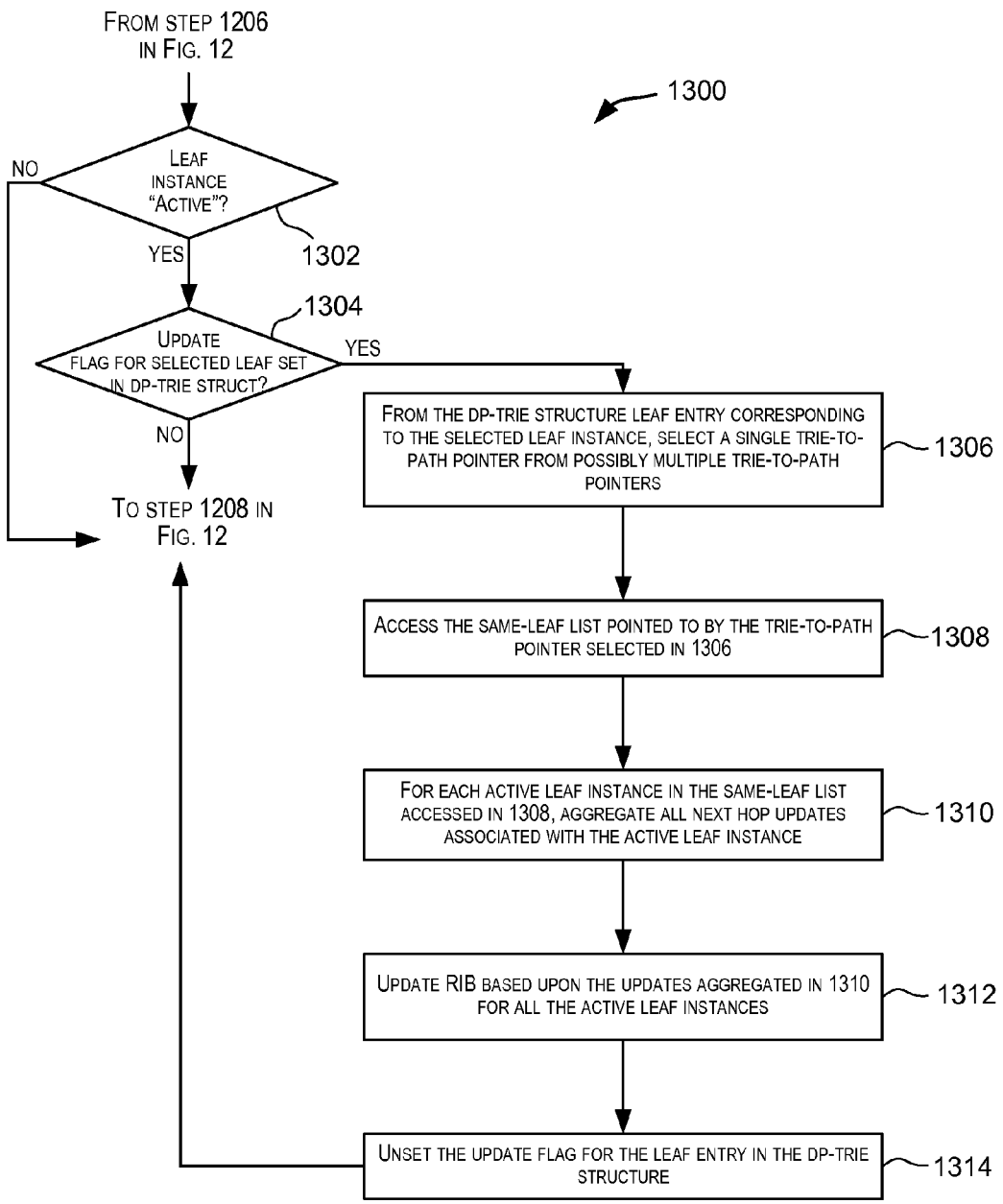
FIG. 13 depicts a high level simplified flowchart depicting a method performed by a node for updating the RIB according to an embodiment of the present invention.

As depicted in FIG. 13, after determining in 1206 of FIG. 12 that the leaf instance is not disabled, a check is then made to see if the selected leaf instance selected is marked as active (step 1302). If it is determined that the leaf instance is not marked as active, then processing continues with step 1208 depicted in FIG. 12. This is because the processing is only interested in processing active leaf instances. Further, since each node-leaves list is ordered such that any active leaf instances are positioned at the head of the node-leaves list, occurrence of a non-active leaf instance indicates that there are no more active leaf instances in the node-leaves list. Accordingly, processing can proceed with step 1208 in FIG. 12.

If it is determined in 1302 that the selected leaf instance is marked as active, then a check is made to see if the update flag for the leaf is set in the dp-trie structure (step 1304). If the update flag is set, then processing continues with step 1306. If the update flag is not set, it indicates that nothing has changed for this leaf and processing is then performed to select the next leaf instance in the node-leaves list and processing continues with step 1208 in FIG. 12.

Steps 1306 to 1314 in FIG. 13 depict processing that is performed upon determining that the update flag for the selected leaf is set in the dp-trie structure. As previously described, the nodes and leaves in a network environment may be arranged according to different topologies, with each topology having a specific combination of nodes and leaves. Further, a dp-trie structure may be shared for the different topologies with dp-trie structure leaf entry having different trie-to-path pointers for the different topologies, each tri-to-path pointer pointing to a same-leaf list for that topology. After determining that the update flag is set for the leaf entry in the database corresponding to the selected leaf instance, a single trie-to-path pointer is then selected from the possibly multiple trie-to-path pointers associated with the leaf entry (step 1306). The processing for determining which trie-to-path pointer to select in 1306 is depicted in FIG. 14 and described below.

The same-leaf list pointed to by the trie-to-path pointer selected in 1306 is then accessed (step 1308). For each active leaf instance in the same-leaf list accessed in 1308, all next hop updates associated with the active leaf instance are aggregated (step 1310). The RIB is then updated based upon the updates aggregated in 1310 for all the active leaf instances (step 1312). In this manner, the RIB is updated only once for all the accumulated changes. The update flag for the dp-trie structure leaf entry is then unset (step 1314). Processing then continues with step 1208 in FIG. 12.

Figure 14:
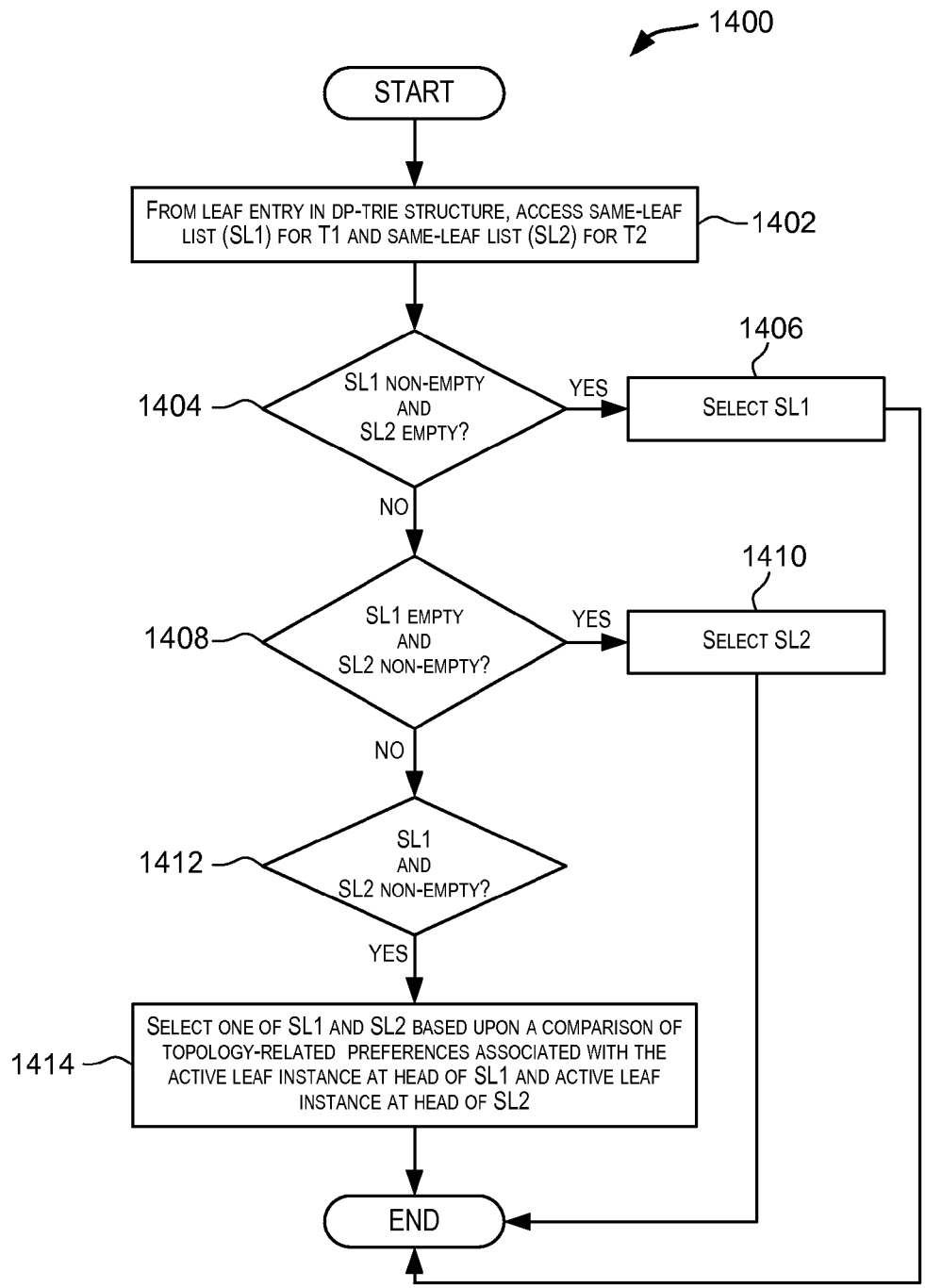
FIG. 14 depicts a high level simplified flowchart depicting a method performed by a node for selecting a specific same-leaf list for a particular topology according to an embodiment of the present invention.

FIG. 14 depicts a high level simplified flowchart 1400 depicting a method performed by a node for selecting a specific same-leaf list for a particular topology according to an embodiment of the present invention. The processing depicted in flowchart 1400 may be performed in software (e.g., instructions, code, program) executed by a processor, in hardware, or in combinations thereof. The software may be stored on a non-transitory computer-readable storage medium and may be executed by one or more processors. In one embodiment, the processing is performed by processor 210 depicted in FIG. 2. In one embodiment, the processing depicted in FIG. 14 is performed during step 1306 depicted in FIG. 13. The processing depicted in FIG. 14 and described below assumes that there are two topologies T1 and T2. Accordingly, there are two trie-to-path pointers associated with the leaf entry in the dp-trie structure, one pointer pointing to a same-leaf list SL1 for T1 and the other pointing to same-leaf list SL2 for T2. It should however be apparent that the teachings of the present invention are not limited to two topologies but may be extended to multiple topologies.

As depicted in FIG. 14, the same-leaf lists (SL1 and SL2) are accessed using the trie-to-path pointers associated with the dp-trie structure entry for the leaf (step 1402). A determination is then made if SL1 is non-empty and SL2 is empty (step 1404). A same-leaf list is empty if there are no leaf instances in the same-leaf list. If it is determined in 1404 that SL1 is non-empty and SL2 is empty, then SL1 is selected (step 1406). Else, a determination is made if SL1 is empty and SL2 is non-empty (step 1408). If it is determined in 1408 that SL1 is empty and SL2 is not empty, then SL2 is selected (step 1410). Else, a determination is made to see if SL1 and SL2 are both non-empty (step 1412). If both the same-leaf lists are non-empty, then one of SL1 and SL2 is selected based upon a comparison of topology-related preferences associated with the active leaf instance at the head of SL1 and active leaf instance at the head of SL2 (step 1414). For example, if the head leaf instance in SL1 is marked as "preferred" and the head leaf instance of SL2 is not, then SL1 is selected. Likewise, if the head leaf instance in SL2 is marked as "preferred" and the head leaf instance of SL1 is not, then SL2 is selected. It should be noted that both SL1 and SL2 cannot be empty since this would have caused the leaf entry in the dp-trie structure to be deleted.

Accordingly, as described above with respect to FIGS. 13 and 14, the change list is traversed and the RIB updated for nodes specified by the node entries in the change. In this manner, the updates to the RIB are performed in a node-centric manner. Further, for a particular node, changes are made for all the updated active leaves advertised by the node. Additionally, when a leaf is selected for updating the RIB, all the updates associated with that leaf are aggregated using the same-leaf list. The RIB is then updated based upon the aggregated changes.

In this manner, the RIB is updated for only those nodes and leaves that are indicated as having changes associated with them. In the case of the nodes, the change list identifies nodes that have changes associated with them and for which the RIB is to be updated. For the leaves, the leaf entries in dp-trie structure 402 that have update flags set identify leaves having associated changes and for which the RIB is to be updated. The identification of which nodes or leaves have changes associated with them can be performed without having to visit or process all the nodes and leaves in the network environment. Further, for a leaf, the RIB is only updated for active instances of that leaf, i.e., for leaf instances that have the lowest associated cost metrics. The manner in which the RIB is updated improves the overall efficiency of the RIB update process. Unnecessary processing and updates for unchanged nodes and leaves is avoided. This provides significant savings in time for updating the RIB, especially for updating leaves since the number of leaves can be potentially very large but the leaves that have associated changes can be a very small percentage of the total available leaves.

Accordingly, the amount of time needed to update the RIB is directly proportional to the number of nodes and leaves that have changes associated with them, and independent of the total number of nodes and leaves. In one embodiment, changes to nodes are translated to changes to leaves that are affected by the nodes changes. In this manner, the RIB update is directly proportional to the number of leaves that have changes associated with them, and independent of the total number of leaves. For example, if there are a total of X leaves in the network environment and only Y leaves from the X have changes associated with them, where Y<X, the time for updating the RIB for the leaves is proportional to Y and independent of X. The time for updating the leaves information in the RIB is of order O(Y). This makes the RIB update process very scalable and decoupled from the vast number of total number of leaves in the network environment. This is especially important in today's growing networks where the speed of convergence of routing information stored by the nodes is becoming a key factor for network operators/administrators in selecting/differentiating between various network provider vendors.

In the embodiments described above, a node-leaves list associated with a node entry does not comprise multiple instances of the same leaf (although the same-leaf list may comprise multiple instances of the leaf). However, in some embodiments of the present invention, within a topology, preferences may be associated with leaf instances. In such an embodiment, a node-leaves list for a node may comprise multiple instances of the same leaf. For example, a node-leaves list associated with a node entry specifying a node may comprise two instances of the same leaf, with one instance being marked as "preferred". In such an embodiment, both the instances of the leaf are part of the same-leaf list for that leaf. In this embodiment, when determining which leaf instance in the same-leaf list is to be marked as active, the preferences associated with leaf instances are considered first followed by, if needed, the cost metrics associated with the leaf instances. For example, if there is only one "preferred" leaf instance in the same-leaf list, then that leaf instance is marked as active irrespective of the cost metrics associated with the leaf instances in the same-leaf list. If there are multiple leaf instances marked as "preferred", then from among the preferred leaf instances the one with the lowest associated cost metric is marked as the active leaf instance. If none of the leaf instances in the same-leaf list are marked as "preferred", then the leaf instance with the lowest associated cost metric is marked as the active leaf instance. Other processing related to the path-entry data structure and the dp-trie structure is the same as previously described.

Accordingly, embodiments of the present invention can handle situations where there is a change in preferences in the network environment. This may occur, for example, upon the occurrences of common network events such as a link flap, rebooting of a node, output of the SPT computation indicates a change, etc. The same-leaf list is reordered when there is a change in the preferences associated with one or more leaves in the network environment. The various linkages in the path-entry data structure and the database enable RIB updates when the preference associated with a leaf changes.

The path-entry data structure and the dp-trie structure and the manner in which they are used, as described above, provide a unique technique for associating nodes and leaves in a network environment that enables efficient handling of network issues such as updating routing information for an any-cast leaf (i.e., a leaf advertised by multiple nodes) advertised in a single link-state topology by optimizing searches for alternate paths, updating an anycast leaf advertised across multiple topologies carried by the same link state routing protocol by optimizing searches for alternate paths across topologies, updating of routes specific to a node for which the path has changed after an SPT computation such as due to a preference change or path change, etc.

Processing of Overlay Tunnels (e.g., ISIS Shortcut LSPs)

As described above, various changes to the network may cause the routing information stored by a network device to be changed. In one embodiment, the routing information may also need to be changed when an overlay circuit or tunnel is added or deleted. An overlay circuit or tunnel may be referred to by different names such as a shortcut circuit, a logical circuit, a virtual circuit (e.g., Generic Routing Encapsulation (GRE) tunnels (IPv6) tunnels, Multiprotocol Label Switching (MPLS) tunnels). An embodiment is described below with respect to MPLS tunnels or label switched paths (LSPs). However, this is not intended to limit the scope of embodiments of the present invention as recited. Other kinds of overlay tunnels are also included within the scope.

For example, the routing information stored by a router may need to be updated when an MPLS tunnel is added to a network. The MPLS tunnel may start at a start node (Ns) and end at an end node (Ne) and may be configured to provide a shortcut from node Ns to node Ne. Hence such an MPLS tunnel is also commonly referred to as a shortcut tunnel. Further, for an MPLS tunnel established between Ns and Ne, a packet received by Ns is forwarded to Ne via the MPLS tunnel using labels. Accordingly, an MPLS tunnel is commonly referred to as a label switched path or LSP.

Typically, when there is a change in the state of a shortcut LSP, it impacts the SPT and thus triggers full SPF processing which causes the SPT to be regenerated. A full SPF processing is however very resource (e.g., processing resources and memory resources) intensive and thus puts considerable strain on the resources of the network device performing the processing. The full SPF processing rebuilds the SPT and then uses the rebuilt SPT to make changes to the routing information stored by a router. This in turn increases the amount of time needed to update the routing information. For example, in an ISIS implementation, a full SPF processing may be triggered/run whenever information is received indicating a change in the state of a shortcut LSP. This processing causes a strain on network device resources in networks observing continuous flaps of shortcut LSPs. The full SPF execution rebuilds the SPT and visits all prefixes of all routers in the network to update the changed prefixes to RIB.

According to an embodiment of the present invention, full SPF processing is not needed upon the creation or deletion of a shortcut LSP (overlay tunnel in general) if the LSP does not influence the topology of the network. In such a scenario, the routing information stored by a router may be updated in an efficient manner without having to generate a new SPT by performing a full SPF. Since a full SPF does not need to be executed, the strain imposed by the SPT processing on resources of the network device performing the processing is alleviated.

In one embodiment, in order to enable routing information to be updated without running a full SPF, a router stores parent-child information, which is used by the router to update the routing information without executing a full SPF processing. The parent-child information for a router is generated based upon an SPT generated for the router as a result of execution of an SPF algorithm by the router. The parent-child information is subsequently used to update the routing information without having to run another full SPF algorithm.

In one embodiment, the parent-child information stored by a router node stores information for each node identified in the SPT generated for the router node, where the router node is the root of the SPT. In one embodiment, for a node in the SPT (including the root node which corresponds to the router doing the processing), the parent-child information stored by the root node comprises:

(a) a list of zero or more parent nodes of the SPT node. A node is considered a parent of the SPT node if there is a link (either native or overlay tunnel) in the SPT from the parent node to the SPT node;

(b) a list of zero or more children nodes of the node. A node is considered a child of the SPT node if there is a link (either native or overlay tunnel) in the SPT from the SPT node to the child node;

(c) The parent-child information may also store information related to, for each parent node, information related to a link between the parent node and the SPT node. In one embodiment, this information includes:

(i) A cost metric associated with the link. The cost metric indicates a cost of communicating data from the parent node to the SPT node;

(ii) A status for the link (either active or inactive). A link is said to be active between a parent node and a child node when the link is used to reach the child from the parent in the SPT. In the example described below, for the example in FIG. 15a, node R4 has two parents, R2 and R3 out of which only the R2 to R4 link is active. In the same example, if R3 had two links to reach R4 one with metric 20 and the other with metric 30, still the link with the metric 20 cannot be considered as active.

(iii) Information indicating a type of link (native or overlay). A native topology is the topology excluding overlay interfaces such as LSPs. A native path is the shortest path to reach a SPT node from the SPT Root node in the native topology; and (iv) A total cost metric for reaching the SPT node from the SPT root node using the link. The total cost metric is the total cost for reaching the SPT node from the root node in the SPT using this link.

(d) The parent-child information may also store information related to, for each child node, information related to a link between the SPT node and the child node. In one embodiment, this information includes:

(i) A cost metric associated with the link. The cost metric indicates a cost of communicating data from the SPT node to the child node;

(ii) A status for the link (either active or inactive). An "active" status for a link implies that the link has the lowest associated cost metric for reaching the child node from the SPT node;

(iii) Information indicating a type of link (native or overlay); and (iv) A total cost metric for reaching the child node from the SPT root node using the link. The total cost metric is the total cost for reaching the child node from the root node in the SPT using this link.

In one embodiment, the information included in the parent-child information is such that it can be used to answer two types of queries:

(1) Given a particular SPT node, provide a list of all children of the particular node. The list may include zero or more nodes; and (2) Given a particular SPT node, provide a list of all parents of the particular node. The list may include zero or more modes.

Figure 15A:
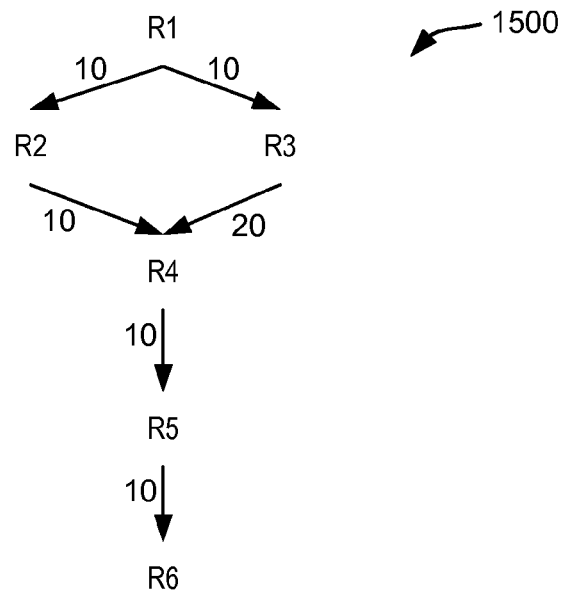
FIGS. 15A and 15B depict a sample SPT generated for a network topology according to an embodiment of the present invention.

The information included in the parent-child information stored by a node can be explained using the example SPT 1500 depicted in FIG. 15A for a sample network topology. SPT 1500 may have been generated as a result of SPF processing performed by node R1. As shown, node R1 forms the root of SPT 1500. SPT 1500 comprises five additional nodes (R2, R3, R4, R5, and R6) that are reachable from node R1. Although not shown in FIGS. 15A (and 15B), one or more of the router nodes may own zero or more leaves. In SPT 1500, an arrow from one node to another represents a link between the nodes for sending data from the one node to the other.

In FIG. 15A, a number is printed proximal to each link and represents the cost metric associated with that link. This represents the cost of communicating data using the link from one node (parent node) to the other node (child node). For example in FIG. 15A, all the links have an associated cost metric of 10, except for the link from R3 to R4, which has an associated cost metric of 20.

In one embodiment, node R1 stores parent-child information for efficient processing of additions/deletions of shortcut LSPs. The parent-child information stored by node R1 is built based upon SPT 1500 and may include:

Node R1 (root node)
  Parent list=NULL
  Child list=R2, R3
  R1 to R2 Link information:
    Cost: 10
    Status: Active
    Type: Native
    Total Cost: 10 (cost to reach R2 from R1)
  R1 to R3 Link information:
    Cost: 10
    Status: Active
    Type: Native
    Total Cost: 10 (cost to reach R3 from R1)
Node R2
  Parent list=R1
  R1 to R2 Link information:
    Cost: 10
    Status: Active
    Type: Native
    Total Cost: 10 (cost to reach R2 from R1)
  Child list=R4
  R2 to R4 Link information:
    Cost: 10
    Status: Active
    Type: Native
    Total Cost: 20 (cost to reach R4 from R1 via R2)
Node R3
  Parent list=R1
  R1 to R3 Link information:
    Cost: 10
    Status: Active
    Type: Native
    Total Cost: 10 (cost to reach R3 from R1)
  Child list=R4
  R3 to R4 Link information:
    Cost: 20
    Status: Inactive
    Type: Native
    Total Cost: 30 (cost to reach R4 from R1 via R3)
Node R4
  Parent list=R2, R3
  R2 to R4 Link information:
    Cost: 10
    Status: Active
    Type: Native
    Total Cost: 20 (cost to reach R4 from R1 via R2)
  R3 to R4 Link information:
    Cost: 20
    Status: Inactive
    Type: Native
    Total Cost: 30 (cost to reach R4 from R1 via R3)
  Child list=R5
  R4 to R5 Link information:
    Cost: 10
    Status: Active
    Type: Native
    Total Cost: 30 (cost to reach R5 from R1 through R4)
Node R5
  Parent list=R4
  R4 to R5 Link information:
    Cost: 10
    Status: Active
    Type: Native
    Total Cost: 30 (cost to reach R5 from R1)
  Child list=R6
  R5 to R6 Link information:
    Cost: 10
    Status: Active
    Type: Native
    Total Cost: 40 (cost to reach R6 from R1 through R5)
Node R6
  Parent list=R5
  R5 to R6 Link information:
    Cost: 10
    Status: Active
    Type: Native
    Total Cost: 40 (cost to reach R6 from R1)
  Child list=NULL Based upon SPT 1500 depicted in FIG. 15A and based upon the total costs for reaching each node from root node R1, the next hop information stored by node R1 may be as shown in Table A:

TABLE A

| Next hop information stored by node R1 | |
|---|---|
| To Node | Next hop Node |
| R2 | R2 via a native interface from R1 to R2 |
| R3 | R3 via a native interface from R1 to R3 |
| R4 | R2 via a native interface from R1 to R2 |
| R5 | R2 via a native interface from R1 to R2 |
| R6 | R2 via a native interface from R1 to R2 |

Based upon the information in Table A, when a packet arrives at node R1, if the destination of the packet is either R2, R4, R5, or R6, or some leaf owned by these nodes, the packet will be routed to node R2 from R1. If the destination of the packet is R3 or some leaf owned by R3, the packet will be routed to node R3 from R1.

Given a physical or native network topology, one or more overlay tunnels may be created/deleted between nodes of the network. For example, a shortcut LSP 1502 may be created starting at node R1 and ending at node R4. The LSP may, for example, traverse a physical path R1-R2-R4. LSP 1502 is drawn using dotted lines in FIG. 15B to differentiate it from the native topology links between the router nodes shown using solid lines. The cost associated with LSP 1502 is 20 (aggregate of the costs of R1-to-R2 and R2-to-R4). Node R1 may then perform processing to update its stored routing information in response to the creation (or deletion) of the overlay tunnel. In one embodiment, the processing may be performed as depicted in FIGS. 16 and 17 and described below.

Figure 16:
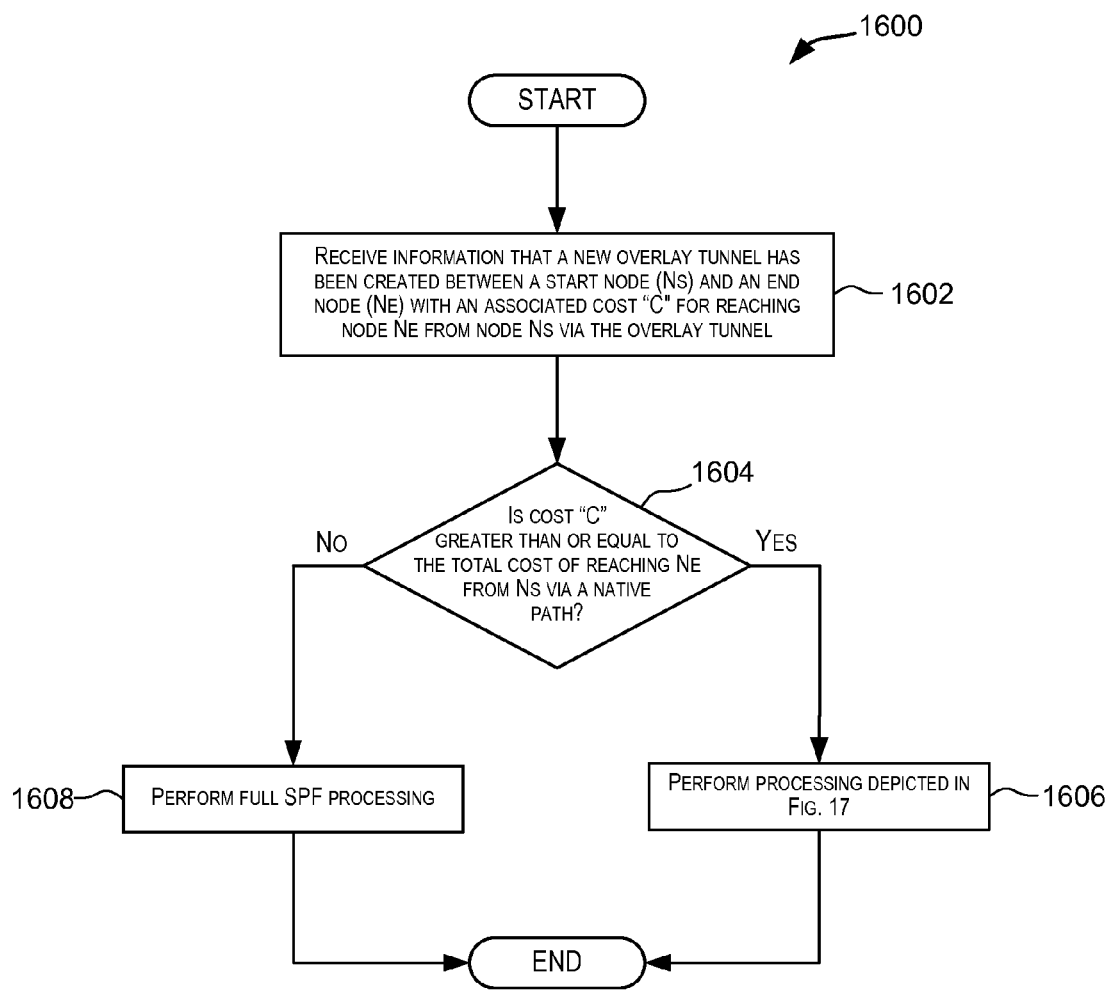
FIG. 16 depicts a high level simplified flowchart depicting a method performed by a node for updating its routing information in response to creation of an overlay tunnel according to an embodiment of the present invention.
Figure 17:
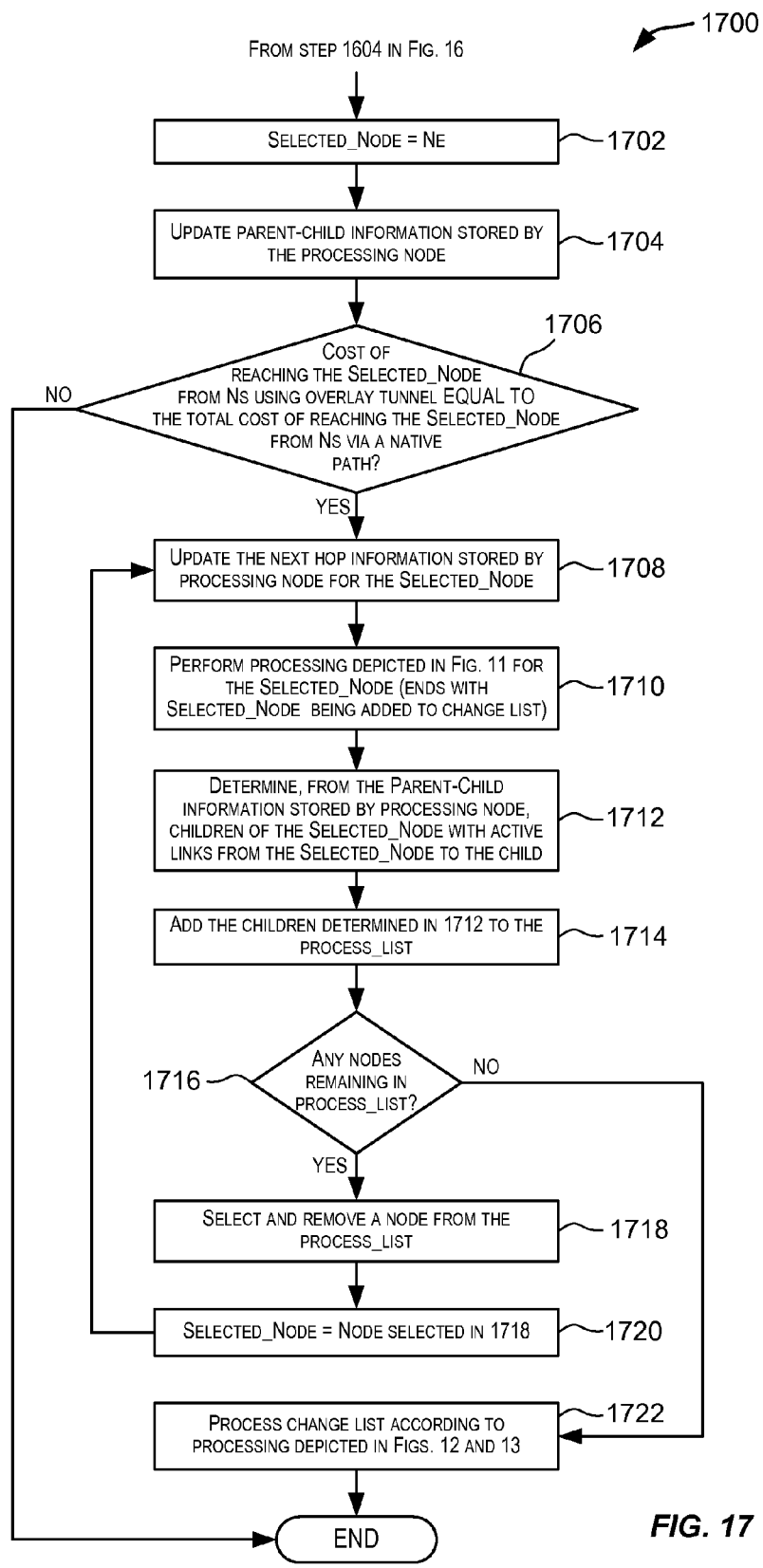
FIG. 17 depicts a high level simplified flowchart depicting a method for updating routing information stored by a node without having to perform full SPF processing in response to creation of an overlay tunnel according to an embodiment of the present invention.

FIG. 16 depicts a high level simplified flowchart 1600 depicting a method performed by a node for updating its routing information in response to creation of an overlay tunnel according to an embodiment of the present invention. The processing depicted in flowchart 1600 may be performed in software (e.g., instructions, code, program) executed by a processor, in hardware, or in combinations thereof. The software may be stored on a non-transitory computer-readable storage medium and may be executed by one or more processors. In one embodiment, the processing may be performed by processor 210 depicted in FIG. 2. For purposes of FIGS. 16 and 17, the node performing the processing is referred to as the "processing node".

As depicted in FIG. 16, the processing node may receive information indicating that a new overlay tunnel (e.g., a shortcut LSP) has been created starting at a start node (Ns) and ending at an end node (Ne) and having an associated cost "C" for reaching node Ne from node Ns via the overlay tunnel (step 1602). For example, for the embodiment depicted in FIG. 15B, node R1 may receive information indicating that a new LSP 1502 has been created starting at node R1 (i.e., node R1 is the Ns) and ending at node R4 (i.e., node R4 is the Ne) and having an associated cost metric 20 for reaching node R4 from node R1 via the shortcut LSP. In the embodiment depicted in FIG. 15b, the shortcut LSP starts at the root node.

The processing node then determines whether the cost "C" is greater than or equal to the total cost of reaching Ne from Ns using a native path (in a native topology) (step 1604). For example, node R1 in FIG. 15B may determine whether the cost associated with LSP 1502 (i.e., 20) is greater than or equal to the total cost of reaching R4 from R1 using a native path.

The result of the check in 1604 could be one of the following:
(a) Cost "C" is greater than the total cost of reaching Ne from Ns using the native path;
(b) Cost "C" is equal to the total cost of reaching Ne from Ns using the native path; or
(c) Cost "C" is less than the total cost of reaching Ne from Ns using the native path.

If (a) or (b), then this does not impact the SPT and updating of the routing information stored by the processing node in response to the overlay tunnel creation can be efficiently accomplished without having to regenerate the SPT by performing full SPF processing. If the result is (c), then this indicates a topological change to the network, thereby impacting the SPT, and as a result full SPF processing would need to be performed to regenerate the SPT and then update the routing information based upon the generated SPT.

Accordingly, if it is determined in 1604 that the cost "C" is greater than or equal to the total cost of reaching Ne from Ns using a native path, then processing is performed as depicted in FIG. 17 (step 1606), wherein, as described below, the routing information stored by the processing router is updated without having to generate a new SPT by performing full SPF processing. If however, if it is determined in 1604 that the cost "C" is less than the total cost of reaching Ne from Ns using a native path, then full SPF processing is performed (step 1608). The new SPT generated in 1608 is then used to update the routing information stored by the processing node.

For example, the cost associated with LSP 1502 from R1 to R4 is 20 and the total cost of reaching R4 from R1 via a native path is also 20 (R1-to-R2 cost 10+R2-to-R4 cost 10 ). In this scenario, the routing information stored by router R1 can be efficiently updated without router R1 having to perform full SPF processing, as per step 1606. This not only alleviates the strain on the processing resources of router R1 but also updates the routing information in a much faster time as compared to updating the routing information after performing full SPF processing.

FIG. 17 depicts a high level simplified flowchart 1700 depicting a method for updating routing information stored by a node without having to perform full SPF processing in response to creation of an overlay tunnel according to an embodiment of the present invention. The processing depicted in flowchart 1700 may be performed in software (e.g., instructions, code, program) executed by a processor, in hardware, or in combinations thereof. The software may be stored on a non-transitory computer-readable storage medium and may be executed by one or more processors. In one embodiment, the processing may be performed by processor 210 depicted in FIG. 2. In one embodiment, FIG. 17 depicts processing that may be performed as part of step 1606 depicted in FIG. 16.

As depicted in FIG. 17, the entry point for the processing is a determination in step 1604 of FIG. 16 that that the cost "C" is greater than or equal to the total cost of reaching Ne from Ns using a native path. A variable "Selected_Node" is used to represent the node being processed. At the start, node Ne is treated as the Selected_Node (step 1702). The parent-child information stored by the processing node is then updated to reflect the creation of the overlay circuit (step 1704). For purposes of updating the parent-child information stored by the processing node, the overlay circuit is treated as a "link" between Ns and Ne. Accordingly, as part of 1704, node Ns is considered to be the parent of node Ne and appropriate updates are made to the parent-child information.

Figure 15B:
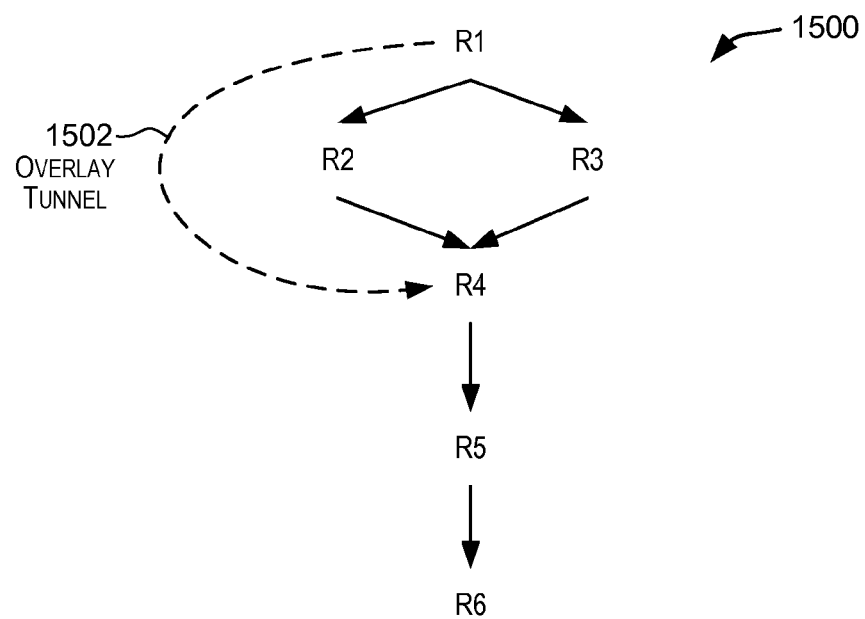

Using the configurations depicted in FIGS. 15A and 15B as examples, the parent-child information stored by node R1 for the SPT shown in FIG. 15A has been described above. Upon the creation of shortcut LSP 1502, the parent-child information stored by node R1 is updated as follows (the changes are shown below in italicized text). The updates include adding information related to the creation of shortcut LSP 1502.

Node R1 (root node)
  Parent list=NULL
  Child list=R2, R3, R4
  R1 to R2 Link information:
    Cost: 10
    Status: Active
    Type: Native
    Total Cost: 10 (cost to reach R2 from R1)
  R1 to R3 Link information:
    Cost: 10
    Status: Active
    Type: Native
    Total Cost: 10 (cost to reach R3 from R1)
  R1 to R4 Link information:
    Cost: 20
    Status: Active
    Type: Overlay
    Total Cost: 20
Node R2
  Parent list=R1
  R1 to R2 Link information:
    Cost: 10
    Status: Active
    Type: Native
    Total Cost: 10
  Child list=R4
  R2 to R4 Link information:
    Cost: 10
    Status: Active
    Type: Native
    Total Cost: 20 (cost to reach R4 from R1 via R2)
Node R3
  Parent list=R1
  R1 to R3 Link information:
    Cost: 10
    Status: Active
    Type: Native
    Total Cost: 10
  Child list=R4
  R3 to R4 Link information:

Cost: 20
Status: Inactive
Type: Native
Total Cost: 30 (cost to reach R4 from R1 via R3)
Node R4
  Parent list=R2, R3, R1
  R2 to R4 Link information:
    Cost: 10
    Status: Active
    Type: Native
    Total Cost: 20
  R3 to R4 Link information:
    Cost: 20
    Status: Inactive
    Type: Native
    Total Cost: 30
  R1 to R4 Link information:
    Cost: 20
    Status: Active
    Type: Overlay
    Total Cost: 20
  Child list=R5
  R4 to R5 Link information:
    Cost: 10
    Status: Active
    Type: Native
    Total Cost: 30 (cost to reach R5 from R1 through R4)
Node R5
  Parent list=R4
  R4 to R5 Link information:
    Cost: 10
    Status: Active
    Type: Native
    Total Cost: 30
  Child list=R6
  R5 to R6 Link information:
    Cost: 10
    Status: Active
    Type: Native
    Total Cost: 40 (cost to reach R6 from R1 through R5)
Node R6
  Parent list=R5
  R5 to R6 Link information:
    Cost: 10
    Status: Active
    Type: Native
    Total Cost: 40
  Child list=NULL After the parent-child information stored by the processing node has been updated, it is determined whether the cost "C" associated with the overlay tunnel from Ns to Ne is equal to the total cost of reaching the Selected_Node (which is Ne in the first pass) from Ns using a native path or interfaces or topology (step 1706). If it is determined in 1706 that cost "C" is not equal to the total cost of reaching the Selected_Node (which is Ne in the first pass) from Ns using a native path, it implies that cost "C" is greater than the total cost of reaching the Selected_Node from Ns using a native path, and processing ends since the next hops are not affected by the newly added shortcut LSP.

If it is determined in 1706 that cost "C" is equal to the total cost of reaching the Selected_Node (which is Ne in the first pass of the processing) from Ns using a native path, then the next hop information stored by the processing node for the Selected_Node is updated to reflect the overlay tunnel (step 1708). For example, the next hop information stored by node R1 for the SPT shown in FIG. 15A was previously shown above in Table A. During the first pass of the processing, R4 is the Selected_Node. Upon the creation of shortcut LSP 1502, the next hop information stored by R1 is updated for R4 as shown below in Table B, with the updates shown in italicized text.

TABLE B

| To Node | Next hop information stored by node R1 (after overlay tunnel creation) |
| --- | --- |
|  | Next Hop Node |
| R2 | R2 via a native interface from R1 to R2 |
| R3 | R3 via a native interface from R1 to R3 |
| *R4* | *R4 via overlay tunnel 1502* |
| R5 | R2 via a native interface from R1 to R2 |
| R6 | R2 via a native interface from R1 to R2 |

The processing depicted in FIG. 11 is then performed for the Selected_Node (which is Ne in the first pass) (step 1710). FIG. 11 depicts a high level simplified flowchart 1100 depicting a method performed upon determining that the next hop information has changed for a node—in the scenario described here, the next hop information has changed for the Selected_Node. The processing depicted in FIG. 11 ends with the Selected_Node being added to the change list (in step 1110 of flowchart 1100).

Using the parent-child information stored by the processing node, children of the Selected_Node having active links from the Selected_Node to the child (i.e., status of link from the Selected_Node to the child is Active) are then determined (step 1712). For a child determined in 1712, the child is added to a "process_list" if the child does not already exist in the process_list (step 1714). For the example depicted in FIGS. 15A and 15B, during the first pass of the processing in FIG. 17, the Selected_Node is node R4 and the parent-child information stored by node R1 is used in 1712 to determine that node R5 is the child of node R4 and the link from R4 to R5 has active status. Node R5 is then added to the process_list in 1714.

A check is then made to see if the process_list contains any nodes (step 1716). If the process_list contains at least one node, then it indicates that there are unprocessed one or more nodes. If it is determined in 1716 that the process_list does not contain any nodes, it implies that all the relevant nodes have been processed and processing continues with 1722. If it is determined in 1716 that there is at least one node in the process_list, a node is selected and removed from the process_list (step 1718) and considered the Selected_Node (step 1720). Processing then continues with 1708 using the new Selected_Node.

As a result of steps 1702, 1704, 1706, 1708, 1710, 1712, 1714, 1716, 1718, and 1720, the node Ne and its descendant nodes in the SPT generated by the processing node are processed. This is because, when the overlay tunnel is created to Ne, it potentially may cause the routing information stored by the processing node for Ne and it descendants to be changed. Accordingly, the descendant nodes of Ne from the SPT are considered one by one and processed. For example, for the SPT depicted in FIG. 15B, if node R4 is the Ne, then node R4 and its descendants (i.e., nodes R5 and R6) are considered. For example, node R4 (which is the Ne for shortcut LSP 1502) is processed during the first pass of the processing depicted in FIG. 17. Node R4's child node R5 is added to the process_list as part of the processing. During the next processing pass, node R5 is processed and its child node R6 added to the process_list. During the next processing pass, node R6 is processed. In this manner, node R4, which is the end node of shortcut LSP 1502, and its descendant nodes R5 and R6 in SPT 1500 are processed.

As shown above, the processing in FIG. 17 involves updating the next hop information stored by the processing node for node Ne and its descendants in step 1708. For example, as a result of the processing triggered by creation of shortcut LSP 1502, the next hop information stored by node R1 and shown above in Table A is updated to that shown in Table C.

TABLE C

Next hop information stored by node R1 (after overlay tunnel creation)

| To Node | Next Hop Node |
| --- | --- |
| R2 | R2 via a native interface from R1 to R2 |
| R3 | R3 via a native interface from R1 to R3 |
| R4 | R4 via overlay tunnel 1502 |
| R5 | R4 via overlay tunnel 1502 |
| R6 | R4 via overlay tunnel 1502 |

After all the relevant descendant nodes of Ne from the SPT have been processed, the change list is then processed according to flowcharts 1200 and 1300 depicted in FIGS. 12 and 13 respectively (step 1722). The processing performed by flowcharts 1200 and 1300 has been described above. This processing results in the routing information (e.g., the RIB information) stored by the processing node being updated. As can be seen from FIGS. 16, 17, 12, and 13, when the cost associated with an overlay tunnel between a start node Ns and an end node Ne is equal to or greater than the total cost of reaching Ne from Ns using a native path, the routing information stored by the processing node is updated without having to generate a new SPT by performing full SPF processing.

EXAMPLES

This section provides examples of how, when the cost associated with an overlay tunnel between a start node Ns and an end node Ne is equal to or greater than the total cost of reaching Ne from Ns using a native path, the routing information stored by the processing node can be updated without having to generate a new SPT by performing full SPF processing. The exampled described in this section are not intended to limit the scope of embodiments of the present invention as recited in the claims.

Figure 18A:
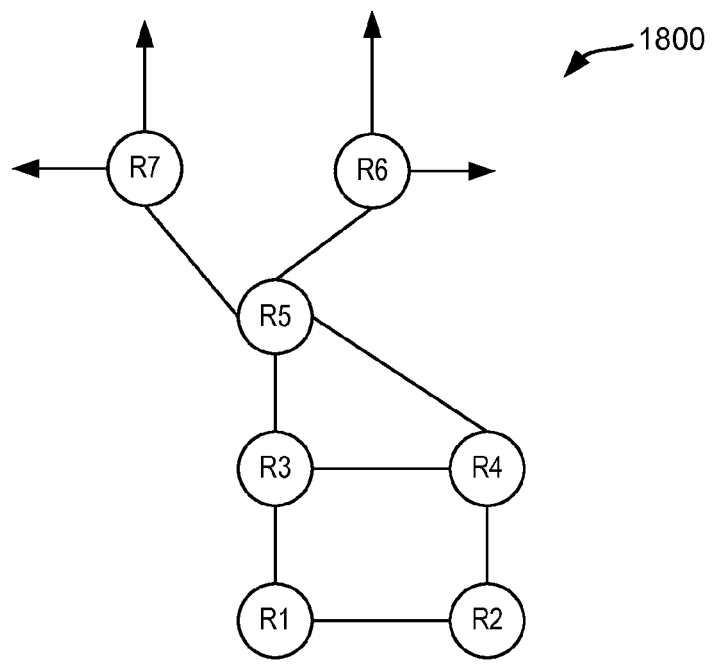
FIGS. 18A, 18B, and 18C depict an example illustrating an embodiment of the present invention.
Figure 18A:
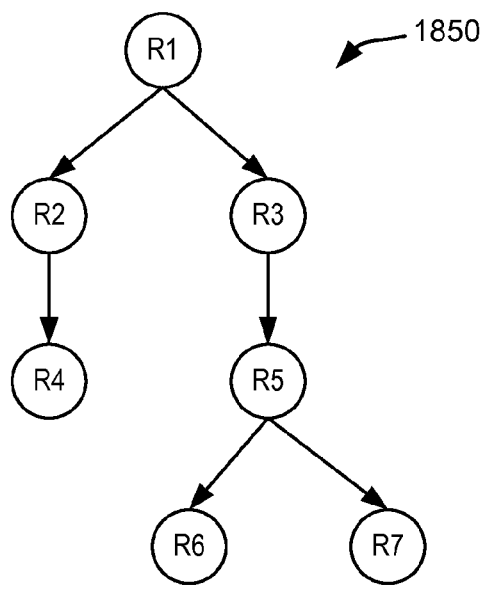

FIG. 18A depicts an example network topology 1800 comprising a plurality of network nodes and an SPT 1850 derived for the network topology. SPT 1850 may be derived when a full SPF is run by node R1. For network topology 1800 depicted in FIG. 18A, it is assumed that the links between nodes R3 and R4 and nodes R4 and R5 have higher metric than rest of the links in the network.

Figure 18B:
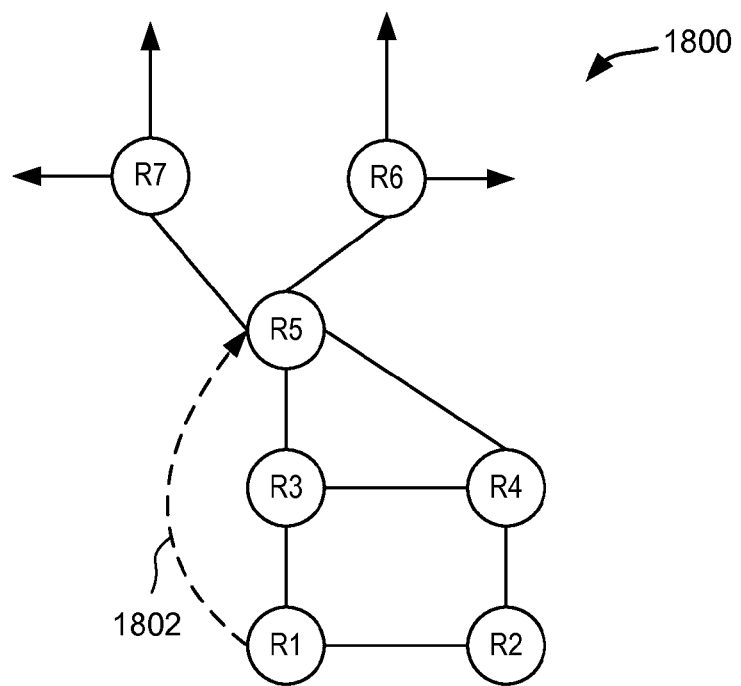
Figure 18B:
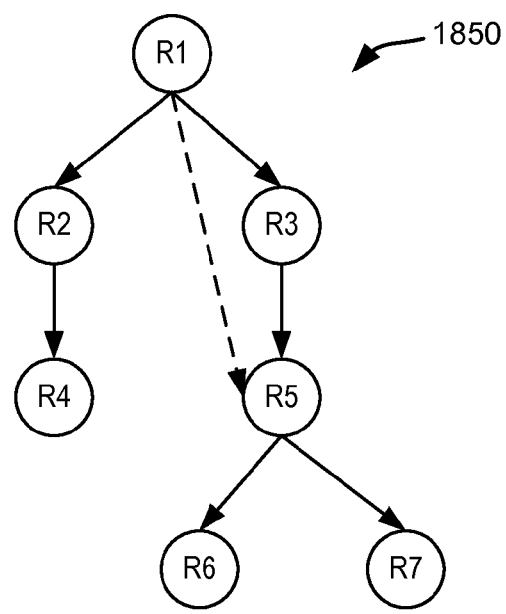
Figure 18C:
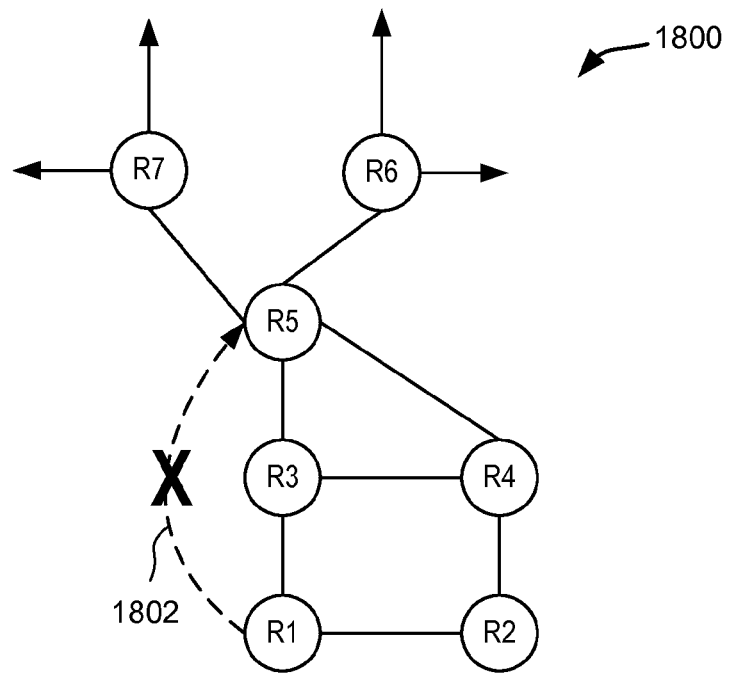
Figure 18C:
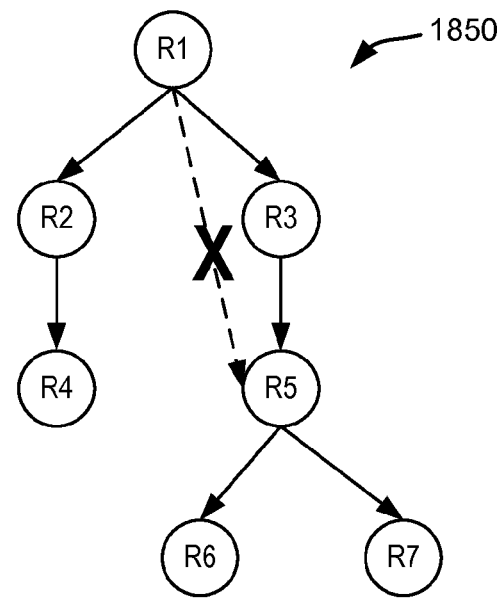

A new shortcut LSP may be created between any two nodes in network topology 1800. For example, as depicted in FIG. 18B, a new shortcut LPS 1802 is created between nodes R1 and R5. If the cost metric associated with LSP 1802 is equal to the cost associated with a native path of reaching R5 from R1, then the next hops associated with nodes R5, R6, and R7, along with the prefixes associated with these nodes may be changed and may need to be updated in RIB. It is to be noted that this does not have an impact on the SPT. If LSP 1802 goes down (as shown in FIG. 18C), this again does not have an impact on the SPT. The next hops of node R1 and their active children may change. The prefixes associated with the changed nodes may need to be updated in the RIB. For example, in FIG. 18C, next hops of nodes R5, R6, and R7 may observe a change and the prefixes associated with those nodes may need to be updated in the RIB.

Now, lets assume that LSP 1802 is created as in FIG. 18B and the cost metric associated with LSP 1802 is higher than the cost associated with a native path of reaching R5 from R1. In this case, the status change of this LSP does not have any impact on the SPT. The next hops of any of the nodes (routers) in the topology are not changed. There are no route updates to RIB. In this scenario, even if LSP 1802 goes down, it does not have any impact on the SPT. The next hops of any of the routers in the topology are not changed. There are no route updates to RIB.

Now, lets assume that LSP 1802 is created as in FIG. 18B and the cost metric associated with LSP 1802 is lower than the cost associated with a native path of reaching R5 from R1. In this case, the creation of the LSP impacts the SPT. A full SPF run is then performed to regenerate the SPT and update the changed prefixes to RIB. If such an LSP goes down, it also impacts the SPT and a full SPF is scheduled to regenerate the SPT and update the changed prefixes to RIB.

Figure 19:
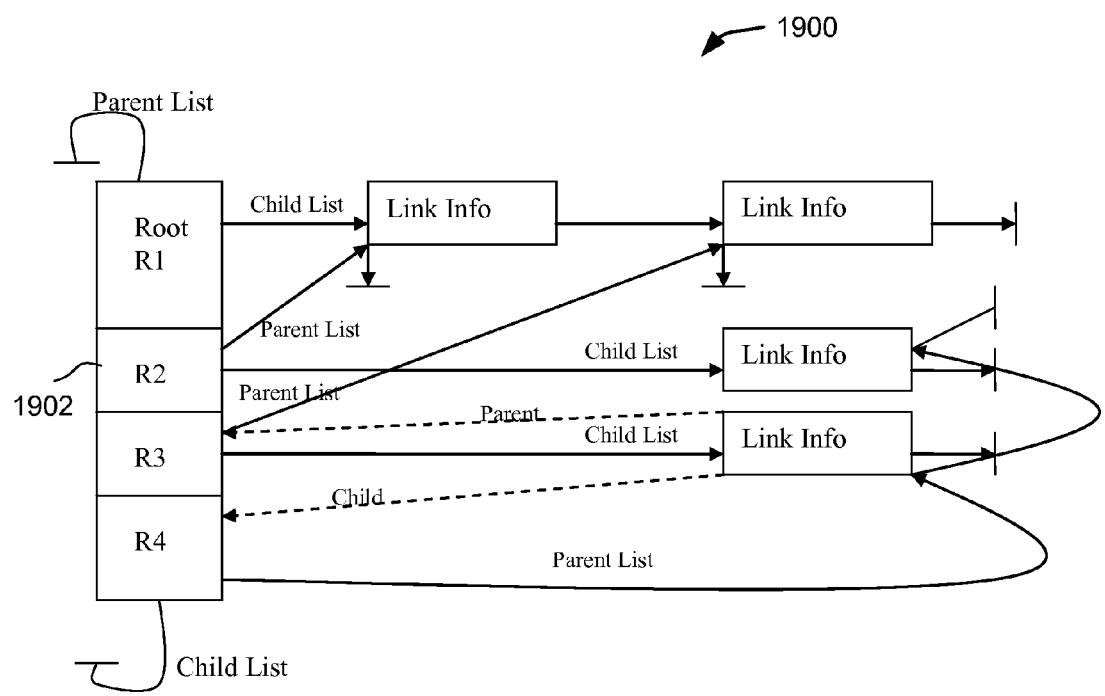
FIG. 19 depicts an example data structure that may be used to store parent-child information according to an embodiment of the present invention.

Various different data structures may be used to implement and store the parent-child information. The data structures are such that they enable nodes to be linked in a way that, given a node, it is possible to identify the nodes parent(s) and children. The data structures can also be updated with the next hop information changes. FIG. 19 depicts an example data structure that may be used to store parent-child information according to an embodiment of the present invention. As shown in FIG. 19, data structure 1900 comprises a table 1902 of entries, with each entry corresponding to a node (router). Each entry has two pointers: a child list pointer and a parent list pointer. Each pointer points to a "link info" data structure. As shown, the root node R1 has a null parents list and the leaf node R4 has an empty child list.

In one embodiment, the link info data structure has the following structure:

```
Struct link_info
{
    global_link; // Link to the Global link_info
    parent_link; // Link to Parent List
    child_link; // Link to Childs list
    struct *parent_pent;  // Back pointer to parent structure
    struct child_pent;     // Back pointer to child structure
    union {
        link_name;
        tnnl_vif_index;
    }link_id;              // Link Id
    link_metric;           // Link cost metric
    total_metric;    // Total cost metric from root node
    flags;        // Indicating active or inactive link status
}
```

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A system comprising:
   a memory configured to:
      store routing information used by the system for forwarding a packet from the system; and
      store information for a shortest path tree (SPT) generated by the system, the SPT comprising a first node and a second node; and
   a processor configured to:
      determine a first cost metric indicative of a cost for communicating data from the first node to the second node via a path from the first node to the second node in the SPT, the first cost metric determined based upon the generated SPT;
      receive, after the SPT has been generated, tunnel information identifying a tunnel starting at the first node and ending at the second node, the tunnel information including a second cost metric indicative of a cost for communicating data from the first node to the second node using the tunnel; and
      update the routing information without regenerating the SPT upon determining that the second cost metric is equal to or greater than the first cost metric.

2. The system of claim 1 wherein the processor is configured to:
   determine a list of one or more nodes from the SPT that are descendant nodes of the second node in the SPT; and
   update the routing information without regenerating the SPT based upon the list of one or more nodes from the SPT that are descendants of the second node in the SPT.

3. The system of claim 1 wherein the processor is configured to:
   determine, for the second node, a list of one or more nodes from the SPT that are child nodes of the second node in the SPT; and
   determine an update to be made to the routing information based upon the determined list of one or more nodes from the SPT that are child nodes of the second node in the SPT.

4. The system of claim 3 wherein the processor is configured to:
   for a first child node in the list of one or more nodes from the SPT that are child nodes of the second node in the SPT:
      determine a third cost metric indicative of a cost of communicating data from the first node to the first child node via a path in the SPT from the first node to the first child node;
      determine a fourth cost metric indicative of a cost of communicating data from the first node to the first child node via the tunnel; and
      compare the third cost metric with the second metric.

5. The system of claim 4 wherein the processor is configured to, upon determining that the third cost metric is equal to the second cost metric, determine, for the first child node, a list of one or more nodes from the SPT that are child nodes of the first child node in the SPT.

6. The system of claim 1 wherein the tunnel is an Multi-protocol Label Switching (MPLS) tunnel.

7. A method comprising:
   storing, by a network device, information for a shortest path tree (SPT), the SPT comprising a first node and a second node;
   determining, by the network device, a first cost metric indicative of a cost for communicating data from the first node to the second node via a path from the first node to the second node in the SPT, the first cost metric determined based upon the generated SPT;
   receive, by the network device, after the SPT has been generated, tunnel information identifying a tunnel starting at the first node and ending at the second node, the tunnel information including a second cost metric indicative of a cost for communicating data from the first node to the second node using the tunnel; and
   updating, by the network device, the routing information without regenerating the SPT upon determining that the second cost metric is equal to or greater than the first cost metric.

8. The method of claim 7 further comprising:
   determining, by the network device, a list of one or more nodes from the SPT that are descendant nodes of the second node in the SPT; and
   wherein the updating comprises updating the routing information without regenerating the SPT based upon the list of one or more nodes from the SPT that are descendants of the second node in the SPT.

9. The method of claim 7 further comprising:
   determining, by the network device, for the second node, a list of one or more nodes from the SPT that are child nodes of the second node in the SPT; and
   determining, by the network device, an update to be made to the routing information based upon the determined list of one or more nodes from the SPT that are child nodes of the second node in the SPT.

10. The method of claim 9 further comprising:
    for a first child node in the list of one or more nodes from the SPT that are child nodes of the second node in the SPT:
       determining a third cost metric indicative of a cost of communicating data from the first node to the first child node via a path in the SPT from the first node to the first child node;
       determining a fourth cost metric indicative of a cost of communicating data from the first node to the first child node via the tunnel; and
       comparing the third cost metric with the second cost metric.

11. The method of claim 10 further comprising:
    upon determining that the third cost metric is equal to the second cost metric, determining, for the first child node, a list of one or more nodes from the SPT that are child nodes of the first child node in the SPT.

12. The method of claim 7 wherein the tunnel is an Multi-protocol Label Switching (MPLS) tunnel.

13. A non-transitory computer-readable storage medium storing a plurality of instructions for controlling a processor, the plurality of instructions comprising:
- instructions that cause the processor to store information for a shortest path tree (SPT), the SPT comprising a first node and a second node;
- instructions that cause the processor to determine a first cost metric indicative of a cost for communicating data from the first node to the second node via a path from the first node to the second node in the SPT, the first cost metric determined based upon the generated SPT;
- instructions that cause the processor to receive, after generation of the SPT, tunnel information identifying a tunnel starting at the first node and ending at the second node, the tunnel information including a second cost metric indicative of a cost for communicating data from the first node to the second node using the tunnel; and
- instructions that cause the processor to update the routing information without regenerating the SPT upon determining that the second cost metric is equal to or greater than the first cost metric.

14. The non-transitory computer-readable storage medium of claim 13 wherein:
- the plurality of instructions further comprises instructions that cause the processor to determine a list of one or more nodes from the SPT that are descendant nodes of the second node in the SPT; and
- the instructions that cause the processor to update the routing information comprise instructions that cause the processor to update the routing information without regenerating the SPT based upon the list of one or more nodes from the SPT that are descendants of the second node in the SPT.

15. The non-transitory computer-readable storage medium of claim 13 wherein the plurality of instructions further comprises:
- instructions that cause the processor to determine, for the second node, a list of one or more nodes from the SPT that are child nodes of the second node in the SPT; and
- instructions that cause the processor to determine an update to be made to the routing information based upon the determined list of one or more nodes from the SPT that are child nodes of the second node in the SPT.

16. The non-transitory computer-readable storage medium of claim 15 wherein the plurality of instructions further comprises:
- for a first child node in the list of one or more nodes from the SPT that are child nodes of the second node in the SPT:
  - instructions that cause the processor to determine a third cost metric indicative of a cost of communicating data from the first node to the first child node via a path in the SPT from the first node to the first child node;
  - instructions that cause the processor to determine a fourth cost metric indicative of a cost of communicating data from the first node to the first child node via the tunnel; and
  - instructions that cause the processor to compare the third cost metric with the second cost metric.

17. The non-transitory computer-readable storage medium of claim 16 further comprising:
- upon determining that the third cost metric is equal to the second cost metric, instructions that cause the processor to determine, for the first child node, a list of one or more nodes from the SPT that are child nodes of the first child node in the SPT.

18. The non-transitory computer-readable storage medium of claim 13 wherein the tunnel is an Multiprotocol Label Switching (MPLS) tunnel.

* * * * *